US012500379B2

(12) United States Patent
Lu

(10) Patent No.: US 12,500,379 B2
(45) Date of Patent: Dec. 16, 2025

(54) ELECTRICAL CONNECTOR WITH SEGMENTS HAVING DIFFERENT WIDTHS

(71) Applicant: Amphenol East Asia Limited (Hong Kong), Kowloon (HK)

(72) Inventor: Lo-Wen (Joan) Lu, Taoyuan (TW)

(73) Assignee: Amphenol East Asia Limited (Hong Kong), Kowloon (HK)

( * ) Notice: Subject to any disclaimer, the term of this patent is extended or adjusted under 35 U.S.C. 154(b) by 329 days.

(21) Appl. No.: 18/193,555

(22) Filed: Mar. 30, 2023

(65) Prior Publication Data

US 2023/0318229 A1 Oct. 5, 2023

(30) Foreign Application Priority Data

Mar. 31, 2022 (CN) ........................ 202220733341.X
Mar. 31, 2022 (TW) ................................ 111203300
(Continued)

(51) Int. Cl.
*H01R 13/64* (2006.01)
*H01R 12/70* (2011.01)
(Continued)

(52) U.S. Cl.
CPC ......... *H01R 13/64* (2013.01); *H01R 12/7005* (2013.01); *H01R 13/502* (2013.01);
(Continued)

(58) Field of Classification Search
CPC .... H01R 13/64; H01R 13/502; H01R 13/516; H01R 13/6271; H01R 13/629;
(Continued)

(56) References Cited

U.S. PATENT DOCUMENTS 7,467,977 B1 12/2008 Yi et al.
7,473,124 B1 1/2009 Briant et al.
(Continued)

FOREIGN PATENT DOCUMENTS

CN 101312275 A 11/2008
CN 201323275 Y 10/2009
(Continued)

OTHER PUBLICATIONS

[No Author Listed], High Speed Backplane Connectors. Tyco Electronics. Product Catalog No. 1773095. Revised Dec. 2008. 1-40 pages.

(Continued)

*Primary Examiner* — Peter G Leigh
*Assistant Examiner* — Nader J Alhawamdeh
(74) *Attorney, Agent, or Firm* — Wolf, Greenfield & Sacks, P.C.

(57) ABSTRACT

An electrical connector includes an insulative housing, metal terminals, and a shell surrounding the housing. Contact portions of the metal terminals are exposed in openings of the housing and are arranged to contact conductive portions of a mating connector when the electrical connector and the mating connector are mated. The shell includes a first portion having a first length and a first width, and a second portion having a second length and a second width different from the first width. The first and second portions of the shell may have heights that are different from each other, such that a step is positioned between the first and second portions of the shell. The housing may have first and second portions having different heights, such that a shoulder is positioned between the first and second portions of the housing.

31 Claims, 17 Drawing Sheets

(30) Foreign Application Priority Data

Mar. 31, 2022 (TW) ................................ 111203301
Aug. 10, 2022 (CN) ......................... 202222094663.7
Aug. 12, 2022 (TW) ................................ 111208806
Oct. 28, 2022 (TW) ................................ 111211862

(51) Int. Cl.
*H01R 13/502* (2006.01)
*H01R 13/516* (2006.01)
*H01R 13/627* (2006.01)
*H01R 13/639* (2006.01)

(52) U.S. Cl.
CPC ....... *H01R 13/516* (2013.01); *H01R 13/6271* (2013.01); *H01R 13/639* (2013.01)

(58) Field of Classification Search
CPC .. H01R 13/639; H01R 12/716; H01R 13/514; H01R 27/02; H01R 13/6594
See application file for complete search history.

(56) References Cited

U.S. PATENT DOCUMENTS

| | | | |
|---|---|---|---|
| 7,494,383 | B2 | 2/2009 | Cohen et al. |
| 7,540,781 | B2 | 6/2009 | Kenny et al. |
| 7,581,990 | B2 | 9/2009 | Kirk et al. |
| 7,588,464 | B2 | 9/2009 | Kim |
| 7,604,502 | B2 | 10/2009 | Pan |
| 7,645,165 | B2 | 1/2010 | Wu et al. |
| 7,690,946 | B2 | 4/2010 | Knaub et al. |
| 7,699,644 | B2 | 4/2010 | Szczesny et al. |
| 7,722,401 | B2 | 5/2010 | Kirk et al. |
| 7,727,027 | B2 | 6/2010 | Chiang et al. |
| 7,727,028 | B1 | 6/2010 | Zhang et al. |
| 7,731,537 | B2 | 6/2010 | Amleshi et al. |
| 7,731,541 | B1 | 6/2010 | Lee et al. |
| 7,753,731 | B2 | 7/2010 | Cohen et al. |
| 7,771,233 | B2 | 8/2010 | Gailus |
| 7,789,676 | B2 | 9/2010 | Morgan et al. |
| 7,794,240 | B2 | 9/2010 | Cohen et al. |
| 7,794,278 | B2 | 9/2010 | Cohen et al. |
| 7,806,729 | B2 | 10/2010 | Nguyen et al. |
| 7,824,192 | B2 | 11/2010 | Lin et al. |
| 7,871,296 | B2 | 1/2011 | Fowler et al. |
| 7,874,873 | B2 | 1/2011 | Do et al. |
| 7,883,369 | B1 | 2/2011 | Sun et al. |
| 7,887,371 | B2 | 2/2011 | Kenny et al. |
| 7,887,379 | B2 | 2/2011 | Kirk |
| 7,906,730 | B2 | 3/2011 | Atkinson et al. |
| 7,914,304 | B2 | 3/2011 | Cartier et al. |
| 7,946,889 | B2 | 5/2011 | Mizumura |
| 7,985,097 | B2 | 7/2011 | Gulla |
| 7,993,147 | B2 | 8/2011 | Cole et al. |
| 8,018,733 | B2 | 9/2011 | Jia |
| 8,083,553 | B2 | 12/2011 | Manter et al. |
| 8,123,544 | B2 | 2/2012 | Kobayashi |
| 8,142,207 | B1 | 3/2012 | Ljubijankic et al. |
| 8,182,289 | B2 | 5/2012 | Stokoe et al. |
| 8,215,968 | B2 | 7/2012 | Cartier et al. |
| 8,216,001 | B2 | 7/2012 | Kirk |
| 8,262,411 | B2 | 9/2012 | Kondo |
| 8,272,877 | B2 | 9/2012 | Stokoe et al. |
| 8,337,247 | B2 | 12/2012 | Zhu |
| 8,348,701 | B1 | 1/2013 | Lan et al. |
| 8,371,875 | B2 | 2/2013 | Gailus |
| 8,382,524 | B2 | 2/2013 | Khilchenko et al. |
| 8,440,637 | B2 | 5/2013 | Elmen |
| 8,480,432 | B2 | 7/2013 | Wu |
| 8,506,319 | B2 | 8/2013 | Ritter et al. |
| 8,506,331 | B2 | 8/2013 | Wu |
| 8,545,253 | B2 | 10/2013 | Amidon et al. |
| 8,550,861 | B2 | 10/2013 | Cohen et al. |
| 8,597,051 | B2 | 12/2013 | Yang et al. |
| 8,657,627 | B2 | 2/2014 | McNamara et al. |
| 8,715,003 | B2 | 5/2014 | Buck et al. |
| 8,715,005 | B2 | 5/2014 | Pan |
| 8,740,637 | B2 | 6/2014 | Wang et al. |
| 8,764,492 | B2 | 7/2014 | Chiang |
| 8,771,016 | B2 | 7/2014 | Atkinson et al. |
| 8,864,506 | B2 | 10/2014 | Little |
| 8,864,521 | B2 | 10/2014 | Atkinson et al. |
| 8,905,777 | B2 | 12/2014 | Zhu et al. |
| 8,926,377 | B2 | 1/2015 | Kirk et al. |
| 8,944,831 | B2 | 2/2015 | Stoner et al. |
| 8,968,034 | B2 | 3/2015 | Hsu |
| 8,998,642 | B2 | 4/2015 | Manter et al. |
| 9,004,942 | B2 | 4/2015 | Paniauqa |
| 9,011,177 | B2 | 4/2015 | Lloyd et al. |
| 9,022,806 | B2 | 5/2015 | Cartier, Jr. et al. |
| 9,028,281 | B2 | 5/2015 | Kirk et al. |
| 9,065,230 | B2 | 6/2015 | Milbrand, Jr. |
| 9,124,009 | B2 | 9/2015 | Atkinson et al. |
| 9,166,317 | B2 | 10/2015 | Briant et al. |
| 9,219,335 | B2 | 12/2015 | Atkinson et al. |
| 9,225,085 | B2 | 12/2015 | Cartier, Jr. et al. |
| 9,246,253 | B1 | 1/2016 | Defibaugh et al. |
| 9,257,778 | B2 | 2/2016 | Buck et al. |
| 9,257,794 | B2 | 2/2016 | Wanha et al. |
| 9,263,835 | B2 | 2/2016 | Guo |
| 9,281,590 | B1 | 3/2016 | Liu et al. |
| 9,287,668 | B2 | 3/2016 | Chen et al. |
| 9,300,074 | B2 | 3/2016 | Gailus |
| 9,337,585 | B1 | 5/2016 | Yang |
| 9,350,095 | B2 | 5/2016 | Arichika et al. |
| 9,431,734 | B2 | 8/2016 | Guo et al. |
| 9,450,344 | B2 | 9/2016 | Cartier, Jr. et al. |
| 9,484,674 | B2 | 11/2016 | Cartier, Jr. et al. |
| 9,509,101 | B2 | 11/2016 | Cartier, Jr. et al. |
| 9,520,686 | B2 | 12/2016 | Hu et al. |
| 9,520,689 | B2 | 12/2016 | Cartier, Jr. et al. |
| 9,531,130 | B1 | 12/2016 | Phillips et al. |
| 9,537,250 | B2 | 1/2017 | Kao et al. |
| 9,640,915 | B2 | 5/2017 | Phillips |
| 9,692,183 | B2 | 6/2017 | Phillips |
| 9,742,132 | B1 | 8/2017 | Hsueh |
| 9,831,605 | B2 | 11/2017 | Buck et al. |
| 9,843,135 | B2 | 12/2017 | Guetig et al. |
| 9,887,485 | B2 | 2/2018 | Lambie et al. |
| 9,935,385 | B2 | 4/2018 | Phillips et al. |
| 9,972,945 | B1 | 5/2018 | Huang et al. |
| 9,997,853 | B2 | 6/2018 | Little et al. |
| 9,997,871 | B2 | 6/2018 | Zhong |
| 10,050,369 | B1 | 8/2018 | Yang |
| 10,096,944 | B2 | 10/2018 | Huang et al. |
| 10,122,129 | B2 | 11/2018 | Milbrand, Jr. et al. |
| 10,135,197 | B2 | 11/2018 | Little et al. |
| 10,211,577 | B2 | 2/2019 | Milbrand, Jr. et al. |
| 10,243,304 | B2 | 3/2019 | Kirk et al. |
| 10,270,191 | B1 | 4/2019 | Li et al. |
| 10,276,995 | B2 | 4/2019 | Little |
| 10,283,910 | B1 | 5/2019 | Chen et al. |
| 10,320,102 | B2 | 6/2019 | Phillips et al. |
| 10,320,125 | B2 | 6/2019 | Ju et al. |
| 10,348,040 | B2 | 7/2019 | Cartier, Jr. et al. |
| 10,381,767 | B1 | 8/2019 | Milbrand, Jr. et al. |
| 10,431,936 | B2 | 10/2019 | Horning et al. |
| 10,439,311 | B2 | 10/2019 | Phillips et al. |
| 10,511,128 | B2 | 12/2019 | Kirk et al. |
| 10,541,482 | B2 | 1/2020 | Sasame et al. |
| 10,573,987 | B2 | 2/2020 | Osaki et al. |
| 10,601,181 | B2 | 3/2020 | Lu et al. |
| 10,680,387 | B2 | 6/2020 | Cheng et al. |
| 10,714,875 | B2 | 7/2020 | Wan et al. |
| 10,741,944 | B2 | 8/2020 | Long |
| 10,777,921 | B2 | 9/2020 | Lu et al. |
| 10,797,446 | B2 | 10/2020 | Liu et al. |
| 10,826,214 | B2 | 11/2020 | Phillips et al. |
| 10,833,437 | B2 | 11/2020 | Huang et al. |
| 10,840,622 | B2 | 11/2020 | Sasame et al. |
| 10,855,020 | B1 | 12/2020 | Phillips et al. |
| 10,916,894 | B2 | 2/2021 | Kirk et al. |
| 10,950,961 | B2 | 3/2021 | Lai et al. |
| 10,965,064 | B2 | 3/2021 | Hsu et al. |

(56) References Cited

U.S. PATENT DOCUMENTS 11,146,025 B2* 10/2021 Lu ..................... H01R 13/6581
11,189,971 B2 11/2021 Lu
11,217,942 B2 1/2022 Lu
11,264,755 B2 3/2022 Te
11,303,065 B2 4/2022 Wang et al.
11,381,015 B2 7/2022 Lu
11,444,397 B2 9/2022 Sasame et al.
11,588,277 B2 2/2023 Jiang
11,621,525 B2 4/2023 Lin
11,652,307 B2 5/2023 Yue
11,710,917 B2 7/2023 Hou et al.
11,764,522 B2 9/2023 Hsu et al.
2008/0220663 A1* 9/2008 Ma ..................... H01R 12/7076 439/733.1
2008/0246555 A1 10/2008 Kirk et al.
2008/0248658 A1 10/2008 Cohen et al.
2008/0248659 A1 10/2008 Cohen et al.
2008/0248660 A1 10/2008 Kirk et al.
2009/0011641 A1 1/2009 Cohen et al.
2009/0011645 A1 1/2009 Laurx et al.
2009/0035955 A1 2/2009 McNamara
2009/0061661 A1 3/2009 Shuey et al.
2009/0117386 A1 5/2009 Vacanti et al.
2009/0203259 A1 8/2009 Nguyen et al.
2009/0239395 A1 9/2009 Cohen et al.
2009/0258516 A1 10/2009 Hiew et al.
2009/0291593 A1 11/2009 Atkinson et al.
2009/0305530 A1 12/2009 Ito et al.
2009/0305533 A1 12/2009 Feldman et al.
2009/0305553 A1 12/2009 Thomas et al.
2010/0048058 A1 2/2010 Morgan et al.
2010/0068934 A1 3/2010 Li et al.
2010/0075538 A1 3/2010 Ohshida
2010/0081302 A1 4/2010 Atkinson et al.
2010/0112846 A1 5/2010 Kotaka
2010/0124851 A1 5/2010 Xiong et al.
2010/0144167 A1 6/2010 Fedder et al.
2010/0203772 A1 8/2010 Mao et al.
2010/0291806 A1 11/2010 Minich et al.
2010/0294530 A1 11/2010 Atkinson et al.
2011/0003509 A1 1/2011 Gailus
2011/0067237 A1 3/2011 Cohen et al.
2011/0104948 A1 5/2011 Girard, Jr. et al.
2011/0130038 A1 6/2011 Cohen et al.
2011/0136388 A1 6/2011 Fu et al.
2011/0143605 A1 6/2011 Pepe
2011/0212649 A1 9/2011 Stokoe et al.
2011/0212650 A1 9/2011 Amleshi et al.
2011/0230095 A1 9/2011 Atkinson et al.
2011/0230096 A1 9/2011 Atkinson et al.
2011/0256739 A1 10/2011 Toshiyuki et al.
2011/0287663 A1 11/2011 Gailus et al.
2012/0094536 A1 4/2012 Khilchenko et al.
2012/0156929 A1 6/2012 Manter et al.
2012/0184145 A1 7/2012 Zeng
2012/0184154 A1 7/2012 Frank et al.
2012/0202363 A1 8/2012 McNamara et al.
2012/0202386 A1 8/2012 McNamara et al.
2012/0202387 A1 8/2012 McNamara
2012/0214344 A1 8/2012 Cohen et al.
2013/0012038 A1 1/2013 Kirk et al.
2013/0017733 A1 1/2013 Kirk et al.
2013/0059479 A1* 3/2013 Ho ..................... H01R 27/02 439/639
2013/0065454 A1 3/2013 Milbrand Jr.
2013/0078870 A1 3/2013 Milbrand, Jr.
2013/0078871 A1 3/2013 Milbrand, Jr.
2013/0090001 A1 4/2013 Kagotani
2013/0109232 A1 5/2013 Paniaqua
2013/0143442 A1 6/2013 Cohen et al.
2013/0196553 A1 8/2013 Gailus
2013/0217263 A1 8/2013 Pan
2013/0225006 A1 8/2013 Khilchenko et al.
2013/0237100 A1 9/2013 Affeltranger
2013/0316590 A1 11/2013 Hon
2014/0004724 A1 1/2014 Cartier, Jr. et al.
2014/0004726 A1 1/2014 Cartier, Jr. et al.
2014/0004746 A1 1/2014 Cartier, Jr. et al.
2014/0024263 A1 1/2014 Dong et al.
2014/0057498 A1 2/2014 Cohen
2014/0113487 A1 4/2014 Chen et al.
2014/0273557 A1 9/2014 Cartier, Jr. et al.
2014/0273627 A1 9/2014 Cartier, Jr. et al.
2014/0370729 A1 12/2014 Wang
2014/0377992 A1 12/2014 Chang et al.
2015/0056856 A1 2/2015 Atkinson et al.
2015/0072546 A1 3/2015 Li
2015/0099408 A1 4/2015 Myer et al.
2015/0111401 A1 4/2015 Guo
2015/0111427 A1 4/2015 Wu et al.
2015/0126068 A1 5/2015 Fang
2015/0140866 A1 5/2015 Tsai et al.
2015/0214673 A1 7/2015 Gao et al.
2015/0236451 A1 8/2015 Cartier, Jr. et al.
2015/0236452 A1 8/2015 Cartier, Jr. et al.
2015/0255904 A1 9/2015 Ito
2015/0255926 A1 9/2015 Paniagua
2015/0340798 A1 11/2015 Kao et al.
2016/0118736 A1 4/2016 Hoyack et al.
2016/0149343 A1 5/2016 Atkinson et al.
2016/0268744 A1 9/2016 Little et al.
2017/0077654 A1 3/2017 Yao et al.
2017/0302031 A1 10/2017 Cheng et al.
2017/0352970 A1 12/2017 Liang et al.
2018/0062323 A1 3/2018 Kirk et al.
2018/0076555 A1 3/2018 Scholeno et al.
2018/0145438 A1 5/2018 Cohen
2018/0198220 A1 7/2018 Sasame et al.
2018/0205177 A1 7/2018 Zhou et al.
2018/0212376 A1 7/2018 Wang et al.
2018/0212385 A1 7/2018 Little
2018/0219331 A1 8/2018 Cartier, Jr. et al.
2018/0241156 A1 8/2018 Huang et al.
2018/0269607 A1 9/2018 Wu et al.
2018/0331444 A1 11/2018 Ono
2019/0006778 A1 1/2019 Fan et al.
2019/0044284 A1 2/2019 Dunham
2019/0052019 A1 2/2019 Huang et al.
2019/0067854 A1 2/2019 Ju et al.
2019/0165518 A1 5/2019 Hsu et al.
2019/0173209 A1* 6/2019 Lu ..................... H01R 12/716
2019/0173232 A1* 6/2019 Lu ..................... H01R 13/6594
2019/0214755 A1 7/2019 Manickam
2019/0334292 A1 10/2019 Cartier, Jr. et al.
2020/0021052 A1 1/2020 Milbrand, Jr. et al.
2020/0076131 A1 3/2020 Hu et al.
2020/0076135 A1 3/2020 Tang et al.
2020/0153134 A1 5/2020 Sasame et al.
2020/0161811 A1 5/2020 Lu
2020/0203865 A1 6/2020 Wu et al.
2020/0203867 A1 6/2020 Lu
2020/0203886 A1 6/2020 Wu et al.
2020/0235529 A1 7/2020 Kirk et al.
2020/0259294 A1* 8/2020 Lu ..................... H01R 12/57
2020/0266584 A1 8/2020 Lu
2020/0328541 A1 10/2020 Lai et al.
2020/0335914 A1 10/2020 Hsu et al.
2020/0358226 A1* 11/2020 Lu ..................... H01R 12/716
2020/0395698 A1 12/2020 Hou et al.
2020/0403350 A1 12/2020 Hsu
2021/0036452 A1 2/2021 Phillips et al.
2021/0050683 A1 2/2021 Sasame et al.
2021/0135389 A1 5/2021 Jiang
2021/0135403 A1 5/2021 Yang et al.
2021/0135404 A1 5/2021 Jiang
2021/0203104 A1 7/2021 Chen
2021/0218195 A1 7/2021 Hsu et al.
2021/0313726 A1 10/2021 Huang et al.
2021/0351529 A1 11/2021 Yang et al.
2021/0399449 A1 12/2021 Guo et al.
2021/0399451 A1* 12/2021 Lu ..................... H01R 43/20
2022/0059954 A1 2/2022 Yue
2022/0069496 A1 3/2022 Yi et al.
2022/0077632 A1 3/2022 Chen et al.

(56) References Cited

U.S. PATENT DOCUMENTS

| | | | | |
|---|---|---|---|---|
| 2022/0336980 | A1 | 10/2022 | Lu | |
| 2022/0360016 | A1 | 11/2022 | Lu et al. | |
| 2023/0013147 | A1 | 1/2023 | Lu | |
| 2023/0253724 | A1 | 8/2023 | Sasame et al. | |
| 2023/0318213 | A1* | 10/2023 | Lu | H01R 12/79 439/634 |
| 2023/0318228 | A1* | 10/2023 | Lu | H01R 13/629 439/660 |
| 2023/0318229 | A1* | 10/2023 | Lu | H01R 13/639 439/660 |

FOREIGN PATENT DOCUMENTS

| | | | |
|---|---|---|---|
| CN | 101600293 | A | 12/2009 |
| CN | 201374434 | Y | 12/2009 |
| CN | 101752700 | A | 6/2010 |
| CN | 101790818 | A | 7/2010 |
| CN | 101120490 | B | 11/2010 |
| CN | 101926055 | A | 12/2010 |
| CN | 201846527 | U | 5/2011 |
| CN | 102106041 | A | 6/2011 |
| CN | 201868621 | U | 6/2011 |
| CN | 102195173 | A | 9/2011 |
| CN | 102224640 | A | 10/2011 |
| CN | 102232259 | A | 11/2011 |
| CN | 102239605 | A | 11/2011 |
| CN | 102292881 | A | 12/2011 |
| CN | 101600293 | B | 5/2012 |
| CN | 102456990 | A | 5/2012 |
| CN | 102487166 | A | 6/2012 |
| CN | 102593661 | A | 7/2012 |
| CN | 102598430 | A | 7/2012 |
| CN | 202395248 | U | 8/2012 |
| CN | 102694318 | A | 9/2012 |
| CN | 102714363 | A | 10/2012 |
| CN | 102738621 | A | 10/2012 |
| CN | 102859805 | A | 1/2013 |
| CN | 202695788 | U | 1/2013 |
| CN | 202695861 | U | 1/2013 |
| CN | 203445304 | U | 2/2014 |
| CN | 103840285 | A | 6/2014 |
| CN | 203690614 | U | 7/2014 |
| CN | 204030057 | U | 12/2014 |
| CN | 204167554 | U | 2/2015 |
| CN | 104409906 | A | 3/2015 |
| CN | 104577577 | A | 4/2015 |
| CN | 104659573 | A | 5/2015 |
| CN | 204349140 | U | 5/2015 |
| CN | 204577746 | U | 8/2015 |
| CN | 204696287 | U | 10/2015 |
| CN | 105633660 | A | 6/2016 |
| CN | 105703103 | A | 6/2016 |
| CN | 106099546 | A | 11/2016 |
| CN | 107069281 | A | 8/2017 |
| CN | 304240766 | S | 8/2017 |
| CN | 304245430 | S | 8/2017 |
| CN | 206712072 | U | 12/2017 |
| CN | 206712089 | U | 12/2017 |
| CN | 107706632 | A | 2/2018 |
| CN | 207677189 | U | 7/2018 |
| CN | 108604760 | A | 9/2018 |
| CN | 208014938 | U | 10/2018 |
| CN | 208014954 | U | 10/2018 |
| CN | 208045773 | U | 11/2018 |
| CN | 208045777 | U | 11/2018 |
| CN | 208078300 | U | 11/2018 |
| CN | 208209042 | U | 12/2018 |
| CN | 208444976 | U | 1/2019 |
| CN | 208445005 | U | 1/2019 |
| CN | 208461040 | U | 2/2019 |
| CN | 208461071 | U | 2/2019 |
| CN | 208461073 | U | 2/2019 |
| CN | 208608398 | U | 3/2019 |
| CN | 208690588 | U | 4/2019 |
| CN | 208797273 | U | 4/2019 |
| CN | 209045918 | U | 6/2019 |
| CN | 209374758 | U | 9/2019 |
| CN | 209730282 | U | 12/2019 |
| CN | 210326355 | U | 4/2020 |
| CN | 112072400 | A | 12/2020 |
| CN | 212392412 | U | 1/2021 |
| CN | 212412336 | U | 1/2021 |
| CN | 107706675 | B | 4/2021 |
| CN | 212874843 | U | 4/2021 |
| CN | 113517619 | A | 10/2021 |
| CN | 214797865 | U | 11/2021 |
| CN | 215377861 | U | 12/2021 |
| CN | 307082539 | S | 1/2022 |
| CN | 217306859 | U | 8/2022 |
| CN | 217903515 | U | 11/2022 |
| CN | 218123778 | U | 12/2022 |
| CN | 218827985 | U | 4/2023 |
| CN | 218867558 | U | 4/2023 |
| EP | 2169770 | A2 | 3/2010 |
| EP | 2405537 | A1 | 1/2012 |
| JP | 2010-129173 | A | 6/2010 |
| TW | M357771 | U | 5/2009 |
| TW | M474278 | U | 3/2014 |
| TW | M502979 | U | 6/2015 |
| TW | I535129 | B | 5/2016 |
| TW | M534922 | U | 1/2017 |
| TW | I596840 | B | 8/2017 |
| TW | M558481 | U | 4/2018 |
| TW | M558482 | U | 4/2018 |
| TW | M558483 | U | 4/2018 |
| TW | M559006 | U | 4/2018 |
| TW | M559007 | U | 4/2018 |
| TW | M560138 | U | 5/2018 |
| TW | M562507 | U | 6/2018 |
| TW | M565894 | Y | 8/2018 |
| TW | M565895 | Y | 8/2018 |
| TW | M565899 | Y | 8/2018 |
| TW | M565900 | Y | 8/2018 |
| TW | M565901 | Y | 8/2018 |
| TW | M567976 | U | 10/2018 |
| TW | M576774 | U | 4/2019 |
| TW | M605564 | U | 12/2020 |
| TW | M613035 | U | 6/2021 |
| TW | M614642 | U | 7/2021 |
| TW | M614728 | U | 7/2021 |
| TW | D217160 | S | 2/2022 |
| TW | M629885 | U | 7/2022 |
| TW | M631787 | U | 9/2022 |
| TW | D221885 | S | 11/2022 |
| TW | D221886 | S | 11/2022 |
| TW | M633882 | U | 11/2022 |
| TW | M639684 | U | 4/2023 |
| WO | WO 2008/124052 | A2 | 10/2008 |
| WO | WO 2008/124054 | A2 | 10/2008 |
| WO | WO 2008/124057 | A2 | 10/2008 |
| WO | WO 2008/124101 | A2 | 10/2008 |
| WO | WO 2010/030622 | A1 | 3/2010 |
| WO | WO 2010/039188 | A1 | 4/2010 |
| WO | WO 2011/100740 | A2 | 8/2011 |
| WO | WO 2017/007429 | A1 | 1/2017 |

OTHER PUBLICATIONS

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 5 pages. URL:https://cdn.amphenol-icc.com/media/wysiwyg/files/documentation/datasheet/inputoutput/io_mini_cool_edge_io.pdf [retrieved on Apr. 11, 2022].

(56) References Cited

OTHER PUBLICATIONS

[No Author Listed], SFF-TA-1016 Specification for Internal Unshielded High Speed Connector System. Rev 0.0.1. SNIA SFF TWG Technology Affiliate. Nov. 15, 2019. 40 pages.
Hou et al., Low Crosstalk Card Edge Connector, U.S. Appl. No. 18/336,825, filed Jun. 16, 2023.
Lu, Electrical Connector With a Housing Surrounded By a Shell With Surface Protrusions, U.S. Appl. No. 18/193,552, filed Mar. 30, 2023.
Lu, Multi-Width Electrical Connector With Recessed Neck Segment, U.S. Appl. No. 18/193,561, filed Mar. 30, 2023.

* cited by examiner

ELECTRICAL CONNECTOR WITH SEGMENTS HAVING DIFFERENT WIDTHS

CROSS-REFERENCE TO RELATED APPLICATIONS

This application claims the benefit of priority under 35 U.S.C. § 119(a)-(d) of Patent Application No. TW 111203300 filed in Taiwan on Mar. 31, 2022, and Patent Application No. TW 111203301 filed in Taiwan on Mar. 31, 2022, and Patent Application No. TW 111208806 filed in Taiwan on Aug. 12, 2022, and Patent Application No. CN 202222094663.7 filed in China on Aug. 10, 2022, and Patent Application No. CN 202220733341.X filed in China on Mar. 31, 2022, and Patent Application No. TW 111211862 filed in Taiwan on Oct. 28, 2022, all of which are incorporated by reference herein in their entireties.

FIELD OF THE INVENTION

The technology disclosed herein relates generally to electrical connectors and more specifically to electrical connectors comprised of multiple segments having at least two different widths. The multiple segments permit connection to multiple portions of a single circuit board or cards or to multiple circuit boards or cards.

BACKGROUND

Electrical connectors are used in many electronic systems. In general, various electronic devices (e.g., smart phones, tablet computers, desktop computers, notebook computers, digital cameras, and the like) have been provided with assorted types of connectors whose primary purpose is to enable an electronic device to exchange data, commands, and/or other signals with one or more other electronic devices, as well as to supply power to components of the electronic device. Electrical connectors are basic components needed to make some electrical systems functional. Signal transmission to transfer information (e.g., data, commands, and/or other electrical signals) often occur via electrical connectors between electronic devices, between components of an electronic device, and between electrical systems that may include multiple electronic devices.

It is generally easier and more cost effective to manufacture an electrical system as separate electronic assemblies, such as printed circuit boards ("PCBs"), which may be communicatively joined together with electrical connectors. In some scenarios, the PCBs, sometime referred to as "cards" herein, to be joined may each have connectors mounted on them. The connectors may be mated directly to each other to interconnect the PCBs.

In other scenarios, the PCBs may be connected indirectly via a cable. Electrical connectors may nonetheless be used to make such connections. For example, the cable may be terminated on one or both ends with a plug type of electrical connector ("plug connector" herein). A PCB may be equipped with a receptacle type of electrical connector ("receptacle connector" herein) into which the plug connector may be inserted to connect the cable to the PCB. A similar arrangement may be used at the other end of the cable, to connect the cable to another PCB, so that signals may pass between the PCBs via the cable.

As will be appreciated, an electrical connector's quality will affect its ability to perform signal transmissions and power transmissions reliably. For a complicated electrical system comprised of multiple electrical devices that rely on each other to operate properly, multiple electrical connectors may be required to operate reliably for the devices to operate as intended within the system.

Use and installation positions vary for different electrical devices. Therefore, there have been many types of connectors that have been developed having different structures designed to meet the needs of use and geometrical size and shape. Demand for small portable electronics has resulted in development of increasingly thinner and lighter electrical connectors of various types.

SUMMARY

The inventors have recognized and appreciated that miniaturization of electrical connectors may lead to quality considerations in terms of structural integrity and ease of use. As connectors become smaller, thinner, and lighter, materials forming the connectors may be more susceptible to damage from routine handling of the connectors if the connectors are misaligned and/or misoriented during mating operations. For example, a connector may be located in a remote position in a system, such that an operator may not be able to observe the connector while a mating connector is being mated with the connector in the system. When the operator's line of sight is obstructed during mating, also referred to a blind mating or blind plugging, misorientation or misalignment of the connectors relative to each other may result in force being applied improperly to a fragile internal connector element, leading to damage or even breakage of the internal connector element. Such damage or breakage may result in power and/or signal transmission failures in the system. Therefore, the inventors have developed electrical connectors that prevent or minimize misalignment or misorientation and/or that prevent or minimize improper application of force to fragile internal connector elements during blind mating. Disclosed herein are aspects of the electrical connectors developed by the inventors.

According to an aspect of the present technology, an electrical connector is provided. The electrical connector may be comprised of an insulative housing, a plurality of sets of terminals, and a shell configured to surround external surfaces of the housing. The sets of terminals may each be comprised of a plurality of metal terminals. The sets of terminals may be disposed in respective segments of the housing such that contact portions of the metal terminals are exposed in openings of the housing and arranged to contact conductive portions of a mating connector when the electrical connector and the mating connector are mated. The shell may be comprised of a first portion having a first length and a first width, and a second portion having a second length and a second width different from the first width. The second length may be same as or different from the first length.

In some embodiments, the first portion of the shell may have a first height. The second portion of the shell may have first and second sides, with the first side having the first height and the second side having a second height different from the first height such that on the second side a step is positioned between the first portion of the shell and the second portion of the shell. In some embodiments, the step may be a right-angle step. In some embodiments, the step may have an angle that is not a right angle. In some embodiments, the first height of the shell may be greater than the second height of the shell.

In some embodiments, the housing is comprised of first and second portions. The first portion may include a first segment having a first height and first external surfaces facing first internal surfaces of the first portion of the shell. The second portion may include at least one housing segment and may have a second height and second external surfaces facing second internal surfaces of the second portion of the shell. The first height of the first portion of the housing may be different from the second height of the second portion of the housing such that a shoulder is positioned between the first portion of the housing and the second portion of the housing. In some embodiments, a position of the shoulder of the housing is proximate a position of the step of the shell. In some embodiments, the shoulder of the housing may be a right-angle shoulder. In some embodiments, the shoulder may have an angle that is not a right angle.

In some embodiments, the first height of the first portion of the shell is level with the first height of the first portion of the housing.

In some embodiments, the second height of the second portion of the shell may be level with the second height of the second portion of the housing.

In some embodiments, the shell may be further comprised of a third portion positioned between the first and second portions of the shell. The third portion may have a third width less that each of the first and second widths of the first and second portions such that a shape of the shell is comprised of at least one recess positioned between the first and second portions of the shell. The step of the shell may be adjacent to and may connect the third portion of the shell to the second side of the second portion of the shell.

In some embodiments, the first portion of the housing may have a first width and the second portion of the housing may have a second width. The housing may be further comprised of a third portion having a third width less than each of the first and second widths of the first and second portions of the housing. The third portion of the housing may be positioned between the first and second portions of the housing such that a shape of the housing is comprised of at least one recess positioned between the first and second portions of the housing. The shoulder of the housing may be adjacent to and may connect the third portion of the housing to the second portion of the housing.

In some embodiments, the first portion of the shell may be comprised of a plurality of locking portions configured to engage with a plurality of engagement portions of the mating connector when the electrical connector and the mating connector are mated.

In some embodiments, the first width of the first portion of the shell may be greater than the first width of the first portion of the housing such that the first portion of the shell is spaced apart from the first portion of the housing by first and second spaces configured to accommodate first and second mating blocks of the mating connector when the electrical connector and the mating connector are mated. The locking portions of the first portion of the shell may be locking holes configured to engage with protruding engagement portions on the first and second mating blocks of the mating connector.

In some embodiments, the housing may be comprised of at least one protrusion, and the shell may be comprised of at least one edge recess configured to engage with the at least one protrusion to fix a position of the shell relative to the housing. In some embodiments, the at least one protrusion of the housing may include a protrusion extending from the third portion of the housing, and the at least one edge recess of the shell may include an edge recess in the third portion of the shell. In some embodiments, the at least one protrusion of the housing may include a protrusion extending from the second portion of the housing, and the at least one edge recess of the shell may include an edge recess in the second portion of the shell. In some embodiments, the at least one protrusion of the housing may be comprised of a channel configured to accommodate an edge of the at least one edge recess of the shell.

In some embodiments, the second portion of the housing may be comprised of a first housing segment having first and second sides respectively facing first and second internal surfaces on the first and second sides of the shell. At least a portion of the first side of the first housing segment may be spaced apart from the first internal surface of the shell by a first plugging space configured to receive a first leg of the mating connector when the electrical connector and the mating connector are mated. The first side of the first housing segment may be comprised of a first groove elongated in a mating direction such that the first plugging space is comprised of at least two widths. A first width of the first plugging space adjacent the first groove may be greater than a second width of the first plugging space not adjacent the first groove.

In some embodiments, the second portion of the shell may be comprised of a plurality of first locking portions positioned opposite the second portion of the housing. At least some of the first locking portions may be configured to engage with engagement portions of the first leg of the mating connector when the electrical connector and the mating connector are mated. In some embodiments, at least two of the first locking portions may be positioned opposite the first groove of the first housing segment. In some embodiments, the first locking portions may be comprised of at least two locking holes configured to engage with at least two protrusions extending from the first leg of the mating connector.

In some embodiments, the second portion of the housing may be comprised of a second housing segment having first and second sides respectively facing the first and second internal surfaces on the first and second sides of the shell. At least a portion of the first side of the second housing segment may be spaced apart from the first internal surface of the shell by a second plugging space configured to receive a second leg of the mating connector when the electrical connector and the mating connector are mated. The first side of the second housing segment may be comprised of a second groove such that the second plugging space may be comprised of at least two widths. A first width of the second plugging space adjacent the second groove may be greater than a second width of the second plugging space not adjacent the second groove.

In some embodiments, the first and second housing segments of the second portion of the housing may be separated by a protrusion block comprised of a first surface configured to abut an internal surface of the second portion of the shell. In some embodiments, at least a portion of the protrusion block may have a height greater than the second height of the second portion of the housing. In some embodiments, the second portion of the shell may be comprised of an engagement portion configured to engage with an engagement portion of the protrusion block of the housing. In some embodiments, the engagement portion of the second portion of the shell may be comprised of a hook, and the engagement portion of the protrusion block of the housing may be comprised of a recess configured to receive the hook. In some embodiments, the protrusion block of the housing may be comprised of a protrusion extending in a direction towards the shell, and the shell may be comprised of an edge recess configured to engage with the protrusion of the protrusion block such that a surface of the protrusion extends beyond an outer surface of the second portion of the shell.

According to an aspect of the present technology, an electrical connector is provided. The electrical connector may be comprised of an insulative housing; at least one housing latch portion extending from a surface of the housing; a plurality of sets of terminals, and a shell configured to surround external surfaces of the housing. The sets of terminals may each be comprised of a plurality of metal terminals disposed in the housing such that contact portions of the metal terminals are exposed in at least one opening of the housing and arranged to contact conductive portions of a mating connector when the electrical connector and the mating connector are mated. The shell may be comprised of a first portion having a first width a second portion having a second width different from the first width, and at least one shell latch portion configured to latch with the at least one housing latch portion to fix a position of the shell relative to the housing.

In some embodiments, the at least one housing latch portion may be comprised of at least one protrusion extending from a side surface of the housing, and the at least one shell latch portion may be comprised of at least one recess configured to latch to the at least one protrusion. In some embodiments, the second width may be less than the first width, and the at least one shell latch may be located on the second portion of the shell.

In some embodiments, the at least one housing latch portion may be comprised of a locking protrusion located on a top surface of the housing, and the at least one shell latch portion may be comprised of a locking latch configured to latch to the locking protrusion. In some embodiments, the locking protrusion may protrude from a recess in a mating surface of the housing such that a top surface of the lock protrusion is even with the mating surface of the housing, and the locking latch may be configured to latch to the locking protrusion such that a top surface of the locking latch is flush with the mating surface of the housing.

The foregoing features may be used, separately or together in any combination, in any of the embodiments discussed herein.

BRIEF DESCRIPTION OF DRAWINGS

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

DETAILED DESCRIPTION

Figure 1:
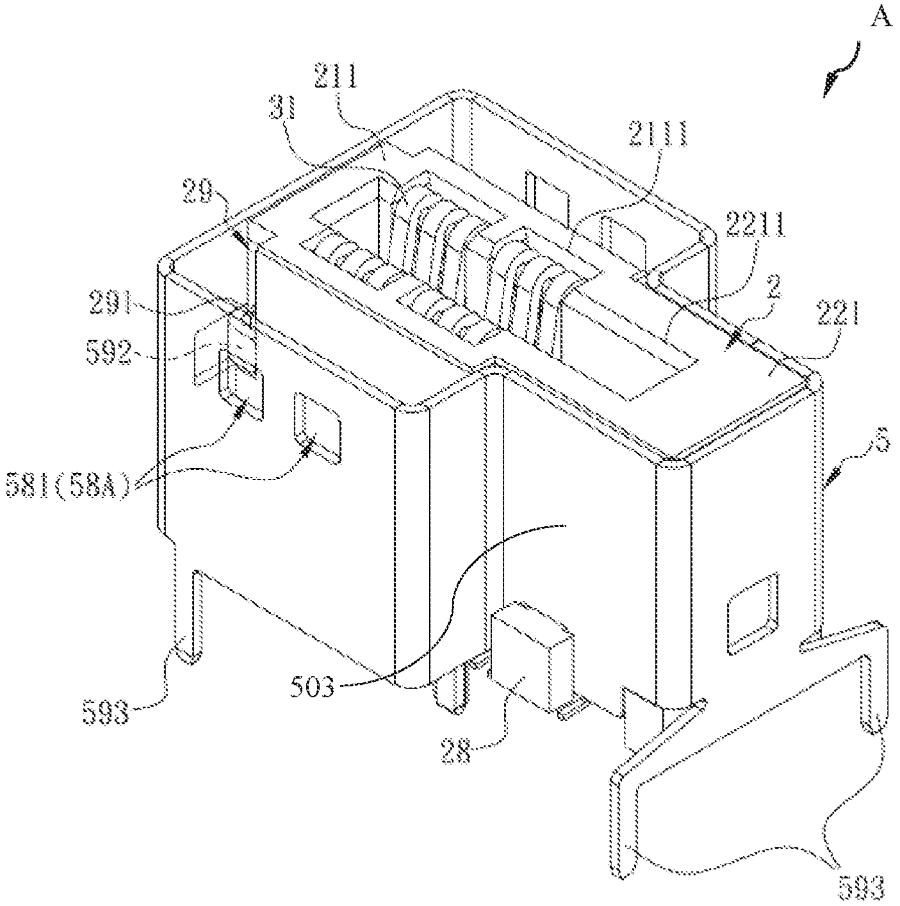
FIG. 1 shows a top front perspective view of an electrical connector, according to some embodiments of the technology disclosed herein.

The inventors have recognized and appreciated design techniques for electrical connectors that enable mated plug and receptacle connectors to occupy a small volume while providing reliable operation for high-integrity signal interconnects, power transfer, and/or low speed signals. Techniques and technology described herein may lead to compact yet robust connectors, which are less likely to be damaged during mating, enabling high performance and compact electronic devices. Additionally, techniques and technology described herein may be used to structure an electrical connector that is able to transmit a plurality of types of signals as well as one or more types of power. The electrical connector may be comprised of a plurality of segments configured to mate with a corresponding plurality of mating segments of a mating connector. In some embodiments of the present technology, the electrical connector may be a receptacle connector comprised of a plurality of receiving portions configured to receive and accommodate a plurality of card portions of a plug connector when the plug and receptacle connectors are mated. The segments may be used advantageously to provide signals to a plurality of different electrical components. For example, a first segment may be comprised of terminals configured to provide signals and/or power to a first electrical subsystem, a second segment may be comprised of terminals configured to provide signals and/or power to a second electrical subsystem, a third segment may be comprised of terminals configured to provide signals and/or power to a third electrical subsystem, etc.

The inventors have further recognized and appreciated that miniaturized electrical connectors are more likely to be damaged by some unintended forces that can arise during blind mating of, e.g., a receptacle connector with, e.g., a plug connector. For example, during mating of the plug connector to the receptacle connector, which may be mounted in a PCB, although it may be preferred that force be applied in a direction parallel to an axial direction of the receptacle connector, in practice, however, a user may not pay special attention to an angle at which the plug connector is oriented with respect to the receptacle connector. Thus, the receptacle connector may be subject to an external force that is not parallel to the axial direction of the receptacle connector. Such off-axis forces can impact the receptacle connector in ways that affect the integrity of signals passing through the receptacle connector. Off-axis forces, for example, may cause the receptacle connector to tilt. Damage may also result if an operator wrongly orients a front side of the plug connector with a rear side of the receptacle connector and attempts to press the connectors together in the wrong orientation. When the operator attempts to insert the plug connector into the receptacle connector while they are misoriented and/or misaligned relative to each other, a large force (e.g., 55 N or more) may be exerted. In some situations, the force may be sufficient to break solder joints connecting metal terminals of the receptacle connector to the PCB. In other scenarios, the off-axis forces may deform the terminals, shift their positions, or otherwise alter their signal paths through the receptacle connector in ways that degrade the integrity of signals passing through the receptacle connector via the terminals. In addition to damaging the metal terminals and/or their solder connections to the PCB, the force may be sufficient to deform or break one or more portions of an insulative housing of the receptacle connector, including a portion bounding a card-receiving portion. The receptacle connector may then cease to be able to hold the plug connector reliably, thus creating the possibility of intermittent disconnection between the plug and receptacle connectors. Consequently, the receptacle connector may lose its functionality and, in turn, normal operation of the electronic device employing the receptacle connector may cease.

Aspects of the techniques and technology described herein may reduce or eliminate the possibility of improper orientation of a plug connector during a mating operation with a receptacle connector. Aspects of the techniques and technology described herein may reduce or eliminate the possibility of misalignment between the plug and receptacle connectors. Aspects of the techniques and technology described herein may minimize or eliminate the application of damaging forces during a mating operation. Aspects of the techniques and technology described herein may be used to implement a single connector that is able to provide signals and power to a plurality of different electrical subsystems.

Aspects of the technology described herein may improve robustness of an electrical connector and may minimize or prevent movement of a mating connector secured to the connector and/or movement of internal parts of the connector and/or prevent movement of the connector relative to a board (e.g., a PCB) to which when the connector is mounted, when the connector is subjected to repeated mating and unmating operations. For example, a connector may be comprised an insulative body, in which a plurality of metal terminals are held, and a metal shell encircling the insulative body. For miniaturized connectors, the terminals may be densely packed such that a spacing between adjacent terminals may be submillimeter. Repeated mating and unmating operations may cause movement (e.g., flexing) of the insulative body and/or the terminals, which may cause undesirable shifting of the terminals leading to shorting of some of the terminals. For example, during mating and unmating of a plug connector to and from a receptacle connector mounted to a PCB, the insulative body of the receptacle connector may experience lateral forces and/or push and pull forces, all of which can cause solder joints to loosen. Aspects of the disclosed technology may fix the position of the shell relative to the insulative body, such that the shell may absorb undesirable forces (e.g., forces that are not aligned with a mating direction of the connectors).

In another aspect, the shell may include structures that cooperate with features on a plug connector to latch the plug connector to the connector, so as to hold the plug connector securely for mating to the connector. the present technology provides various locking and latching mechanisms as well as other mechanisms for fixing the position of the shell relative to the insulative body (collectively referred to as "fixing mechanisms"). Ensuring that the shell is fixed to the housing may ensure that the plug is reliably mated to the electrical connector, even if forces are applied to the plug or a cable attached to it in use. The inventors have recognized techniques for reliably fixing the shell to the housing while retaining a high density of signal and power connections through the connector. As discussed below, fixing mechanisms may be deployed at various locations of the shell and the insulative body, which may be particularly advantageous for elongated connectors in which a shell might otherwise be prone to flexing. For example, for a multi-segmented connector, one or more fixing mechanisms may be located at each segment and/or between adjacent segments, to fix the position of the shell to relative to the insulative body. The mechanisms may be located on one side of the connector (e.g., a front side or a rear side) or may be located on opposite sides of the connector (e.g., front and rear sides) or may be located at any location where shifting is to be minimized or prevented.

It should be understood that features described in connection with any embodiment may be combined with features described in connection with one or more other embodiments even if not expressly shown in the drawings or specifically described herein. For example, features of a shell design described and/or shown for one connector may be used for a shell of another connector even if not shown in the drawings or described herein. In another example, features described and/or shown for an insulative body for one connector may be used in an insulative body for another connector even if not shown in the drawings or described herein. In a further example, a fixing mechanism described and/or shown for one connector may be used for another connector even if not shown in the drawings or described herein.

First Connector Design

Figure 2:
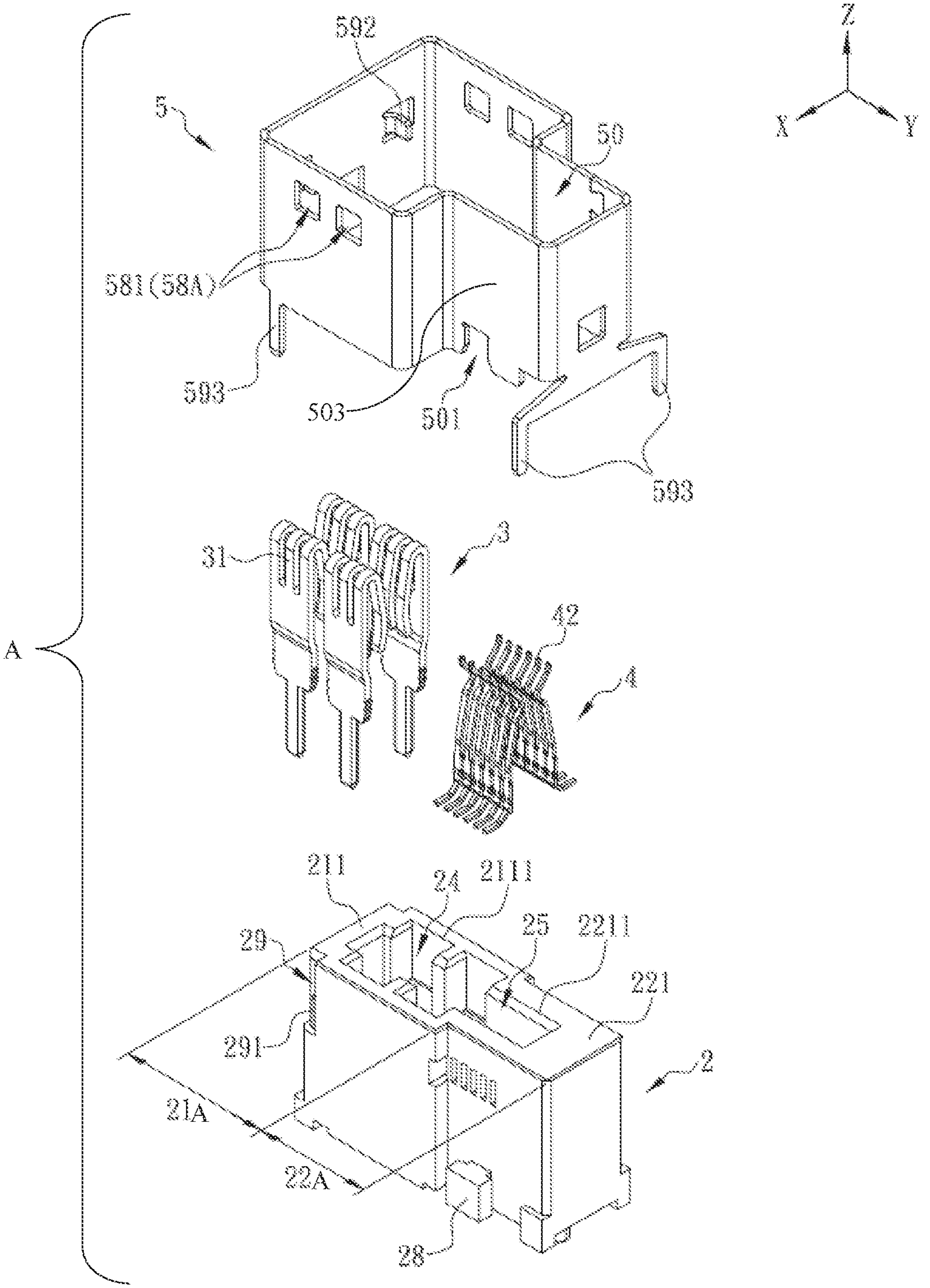
FIG. 2 shows the connector of FIG. 1 in a disassembled state.
Figure 3:
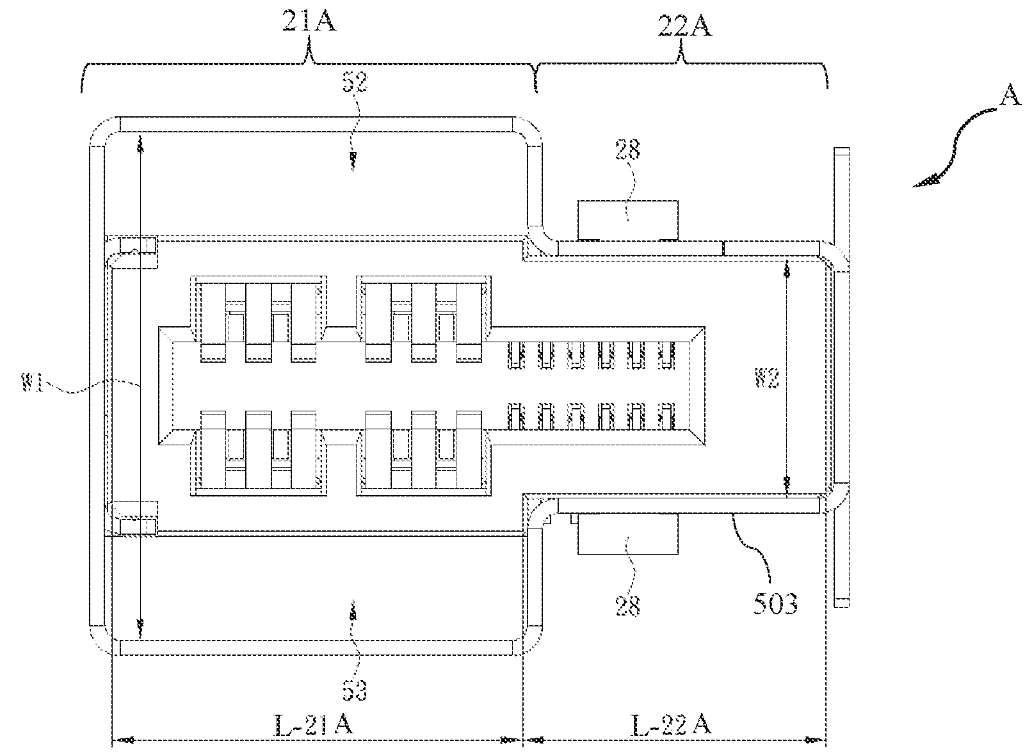
FIG. 3 shows a top plan view of the connector of FIG. 1.
Figure 4:
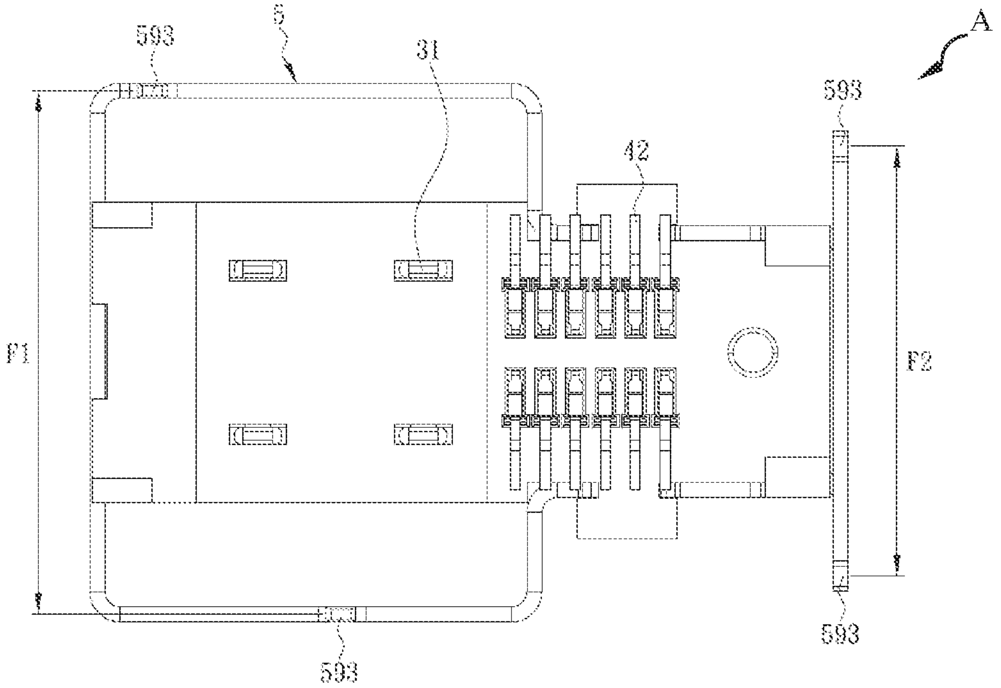
FIG. 4 shows a bottom plan view of the connector of FIG. 1.

Turning now to the figures, FIG. 1 shows a top front perspective view of an electrical connector A, according to some embodiments of the technology disclosed herein. FIG. 2 shows the connector A in a disassembled state. FIGS. 3 and 4 show top and bottom plan views, respectively, of the connector A. The connector A may be, for example, a receptacle connector and may be configured to physically receive and electrically contact a portion of a plug connector when mated with the plug connector. The connector A may be referred to as a board-end connector and may be configured to make electrical contact with at least one board end (e.g., at least one PCB edge). FIGS. 1 through 4 depict a non-limiting example of a first connector design of the present technology.

According to some embodiments of the present technology, the connector A may have a T shape when viewed from above (FIG. 3) or below (FIG. 4). The connector A may be comprised of an electrically insulative body 2, a first terminal set 3, a second terminal set 4 and a metal shell 5. In some embodiments, the insulative body 2 may be comprised of a first body portion 21A and a second body portion 22A. The second body portion 22A may be provided with a body clasping portion 28 located near a bottom edge of each of a front surface of the second body portion 22A and a rear surface of the second body portion 22A, as shown in FIG. 3. The first body portion 21A may have a length L-21A, and the second body portion 22A may have a length L-22A. In some embodiments, the body clasping portions 28 may project perpendicularly from the front and rear surfaces of the second body portion 22A. In some embodiments, the second body portion 22A may be provided with only one body clasping unit 28, on either the front surface or the rear surface. The first and second body portions 21A, 22A may be comprised of first and second mating surfaces 211, 221, respectively, as shown in FIG. 2. The first and second mating surfaces 211, 221 may face in a same direction and may be configured to face a mating connector when the connector A and the mating connector are mated. In some embodiments, the first mating surface 211 may be coplanar with the second mating surface 221.

According to some embodiments of the present technology, the first mating surface 211 may be provided with a first mating interface 2111, and the second mating surface 221 may be provided with a second mating interface 2211. The first mating interface 2111 may be comprised of a first accommodating space 24 formed of a recess that extends from the first mating surface 211 into the first body portion 21A and that is configured to receive a protruding portion of a mating connector when the connector A and the mating connected are mated. Similarly, the second mating interface 2211 may be comprised of a second accommodating space 25 formed of a recess that extends into the second body portion 22A and that is configured to receive a protruding portion of the mating connector when the connector A and the mating connected are mated. In some embodiments, the first and second accommodating spaces 24, 25 may be contiguous and may form a single recess in the connector A. On some other embodiments, the first and second accommodating spaces 24, 25 may be separate from each other may form two recesses in the connector A.

According to some embodiments of the present technology, the shell 5 may bound an assembly space 50 in which the insulative body 2 may be disposed when the shell 5 and the insulative body 2 are assembled together. Front and rear portions of the shell 5 may each be comprised of a first shell clasping portion 501 extending upward from a bottom edge of a shell neck 503, as shown in FIG. 2. In some embodiments, the first shell clasping portions 501 may be openings or cutouts configured to engage with the body clasping portions 28 located near the bottom edges of the front and rear surfaces of the second body portion 22A of the insulative body 2. When the first shell clasping portions 501 are engaged with the body clasping portions 28, the shell 5 and the insulative body 2 may be in a predetermined position relative to each other such that the first and second mating surfaces 211, 221 of the insulative body 2 are aligned with a top edge of the shell 5. An advantageous aspect of such an alignment is that when the shell 5 and the insulative body 2 are being assembled together an operator may easily ascertain whether they are properly positioned relative to each other.

According to some embodiments of the present technology, the shell 5 may have at least two different shell widths such that when the shell 5 and the insulative body 2 are assembled together one or more portions of the shell 5 may be spaced apart from the insulative body 2 and one or more portions of the shell 5 may be positioned close to the insulative body 2 and may even be in physical contact with the insulative body 2. In some embodiments, the assembly space 50 of the shell 5 may be comprised of a first portion in which the first body portion 21A is disposed and a second portion in which the second body portion 22A is disposed. The first portion the assembly space 50 may have a first shell width W1 that is greater than a width of the first body portion 21A such that the front surface of the first body portion 21A is spaced apart from the front portion of the shell 5 by a front plugging space 53 and such that the rear surface of the first body portion 21A is spaced apart from the rear portion of the shell 5 by a rear plugging space 52, as shown in FIG. 3. The second portion the assembly space 50 may have a second shell width W2, corresponding to a width of a region of the shell neck 503, and the second shell width W2 may be sufficient to accommodate the second body portion 22A without an appreciable gap separating the second body portion 22A and the shell neck 503, as shown in FIG. 3. That is, the second body portion 22A may abut or fit snugly in the assembly space 50 of the shell 5 at the shell neck 503 such that the first shell clasping portions 501 may be engaged with the body clasping portions 28 whereas in regions not at the shell neck 503, the first body portion 21A may be spaced apart from the shell 5 by the front and rear plugging spaces 53, 52. As shown in FIG. 3, the first shell width W1 is greater than the second shell width W2 (i.e., W1>W2), giving rise to the T shape mentioned above.

According to some embodiments of the present technology, the shell 5 may be comprised of at least one engagement protrusion 592 that extends inward from the shell 5 to engage with at least one recess (not shown) in the insulative body 2, to fix a relative position of the shell 5 and the insulative body 2. In some embodiments, the insulative body 2 may be comprised of at least one engagement groove 29 that extends downward from the first mating surface 211 of the insulative body 2, as shown in FIG. 2. In some embodiments, a protrusion 291 may extend outward from a side surface of the engagement groove 29. During assembly of the shell 5 and the insulative body 2, when the insulative body 2 is being inserted into the assembly space 50, the engagement protrusion 592 may slide downward along the side surface of the engagement groove 29 until the engagement protrusion 592 abuts a bottom surface of the engagement groove 29 and closely surrounds the protrusion 291, as depicted by the dashed lines in FIG. 1. The engagement protrusion 592 and the engagement groove 29 may interact advantageously to prevent the electrical connector A from being dislodged from a PCB to which the connector A is mounted. For example, the connector A may be welded or fixed to a PCB circuit board and, when a user plugs or unplugs a mating connector to the connector A, the engagement protrusion 592 may abut the bottom surface of the engagement groove 29 and, in turn, the bottom surface of the engagement groove may exert a reactive force (e.g., a resistance force or a friction force) thus preventing the connector A from dislodging or demounting from the PCB. In some embodiments, the protrusion 291 may have an arc-shaped cross section and may resemble a half-pipe. However, the protrusion 291 is not limited to having curved shapes but may have other shapes provided that it is closing surrounded by the engagement protrusion 592.

According to some embodiments of the present technology, the front and rear plugging spaces 53, 52 may have equal or substantially equal lengths, in directions parallel to a Y direction (see FIG. 2), and may be configured to receive front and rear legs extending from a mating connector. During a mating operation, the front and rear legs of the mating connector may align with the front and rear plugging spaces 53, 52 before terminals of the mating connector can come into contact with the first and second terminals sets 3, 4, of the electrical connector A. Although FIGS. 1, 3, and 4 show no plugging space between the shell neck 503 and front and rear surfaces of the second body portion 22A of the insulative body 2, in some embodiments a plugging space may be provided adjacent one or more portions of the front and rear surfaces of the second body portion 22A.

According to some embodiments of the present technology, the second body portion 22A may be comprised of a locking protrusion and the shell neck 503 may be comprised of a locking latch configured to engage with the locking protrusion when the insulative body 2 is inserted in the shell 5. An example of the locking protrusion and the locking latch is discussed below in connection with reference numerals 217 and 594 and FIG. 15.

According to some embodiments of the present technology, the shell 5 may be comprised of at least one set of holes configured to engage the front and rear legs of the mating connector, when the mating connector is mated with the electrical connector A. In some embodiments, a first assembly hole set 58A may be provided on each of a front wall and a rear wall of the shell 5, such that protrusions on the front leg of the mating connector may be received in holes 581 of the first assembly hole set 58A on the front wall of the shell 5 when the front leg is fully inserted in the front plugging space 53 and such that protrusions on the rear leg of the mating connector may be received in similar holes on the rear wall of the shell 5 when the rear leg is fully inserted in the rear plugging space 52. In some embodiments, the holes 581 may be through-holes, as shown in FIG. 1. In some embodiments, the holes 581 on the front and rear walls of the shell 5 may have same a vertical height as respectively measured from bottom edges of the front and rear walls.

According to some embodiments of the present technology, the shell 5 may be comprised of mounting pins 593 that extend from bottom edges of the shell 5, as shown in FIGS. 1 and 4. The mounting pins 593 may be configured to engage with and/or be inserted in corresponding holes or recesses in a PCB on which the electrical connector A is to be mounted. In some embodiments, a mounting pin 593 may extend from a bottom edge of each of the front and rear walls of the shell 5 adjacent the front and rear plugging spaces 53, 52; these mounting pins 593 may be arranged asymmetrically such that the metal pins 593 on the front and rear walls have different distances to a left-side wall of the shell 5. For example, the mounting pin 593 on the front wall of the shell 5 (i.e., the mounting pint 593 at a top left portion of FIG. 4) may be closer to the left-side wall of the shell 5 than the mounting ping 593 on the rear wall of the shell 5. In some embodiments, mounting pins 593 may extend from a right-side wall of the shell 5, as shown in FIGS. 1 and 4. In some embodiments, the mounting pins 593 adjacent the front and rear plugging spaces 53, 52 may be spaced at a first pin pitch F1, and the mounting pins 593 extending from the right-side wall may be spaced at a second pin pitch F2 different from the first pin pitch F1. For example, as shown in FIG. 4, F1 may be greater than F2. In some embodiments, having the two mounting pins 593 adjacent the front and rear plugging spaces 53, 52 be arranged asymmetrically may be beneficial, because such an arrangement may permit a plurality of electrical connectors A to be arranged in parallel more closely to each other (e.g., side by side) on a PCB than electrical connectors having symmetrically arranged mounting pins, because holes in the PCB (for engaging with and/or receiving the mounting pins therein) may be staggered and not closely positioned. The inventors have recognized and appreciated that closely positioned holes may give rise to a weak bridge in the PCB separating the holes, which could result in a weakened mounting connection (e.g., solder joint) due to the increased risk of breakage of the weak bridge during mating operations of the electrical connectors A with mating connectors. On the other hand, the mounting pins 593 extending from the right-side wall of the shell 5 do not have such an increased risk because F2 is less than F1 and therefore the distance to a mounting hole on the PCB for an adjacent electrical connector A would be sufficiently large to avoid forming a weak bridge and thus avoid an increased breakage risk.

As noted above, the electrical connector A may be comprised of a plurality of types of terminals, e.g., the first terminal set 3 and the second terminal set 4, as shown in FIG. 2. According to some embodiments of the technology disclosed herein, the first terminal set 3 may be located in the first body portion 21A of the insulative body 2 and may be comprised of a plurality of first metal terminals 31. The first metal terminals 31 may be power terminals configured to transfer power, and may be arranged in pairs having contact portions that face each other across a first gap, as shown in FIGS. 1 through 4. For example, the contact portions of the pairs of first metal terminals 31 may be exposed in the first accommodating space 24 and may be arranged in two rows separated by the first gap. The first gap may be configured to receive an edge of a board of a mating connector, such that the contact portions of the two rows of the first metal terminals 31 may physically contact opposite sides of the board. The first metal terminals 31 may have a folded structure and may be sized to have a desired power-carrying capacity. In some embodiments, the second terminal set 4 may be located partially or entirely in the second body portion 22A of the insulative body 2 and may be comprised of a plurality of second metal terminals 42. The second metal terminals 42 may be signal terminals configured to convey electrical signals, and may be arranged in two rows that face each other across a second gap, as shown in FIGS. 1 through 4. For example, the contact portions of the second metal terminals 42 may be exposed in the second accommodating space 25 and may be configured to receive an edge of a board of a mating connector, such that the contact portions of the two rows of the second metal terminals 42 may physically contact opposite sides of the board. In some embodiments, the first metal terminals 31 and the second metal terminals 42 may contact different portions of a same board of a mating connector. In some other embodiments, the first metal terminals 31 may contact a first board of mating connector and the second metal terminals 42 may contact a second board of the mating connector, different from the first board. In some embodiments, a width of the first gap may be different from a width of the second gap.

Second Connector Design

Figure 5A:
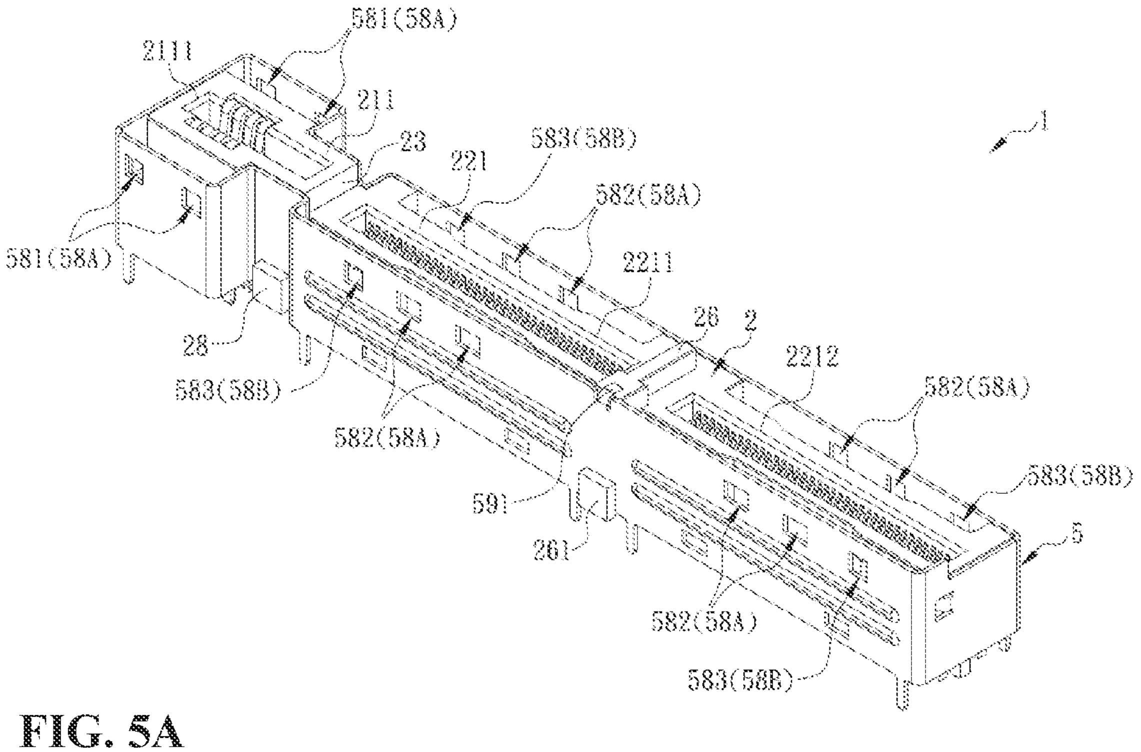
FIGS. 5A and 5B show a top front perspective view and a top rear perspective view, respectively, of an electrical connector, according to some embodiments of the technology disclosed herein.
Figure 5B:
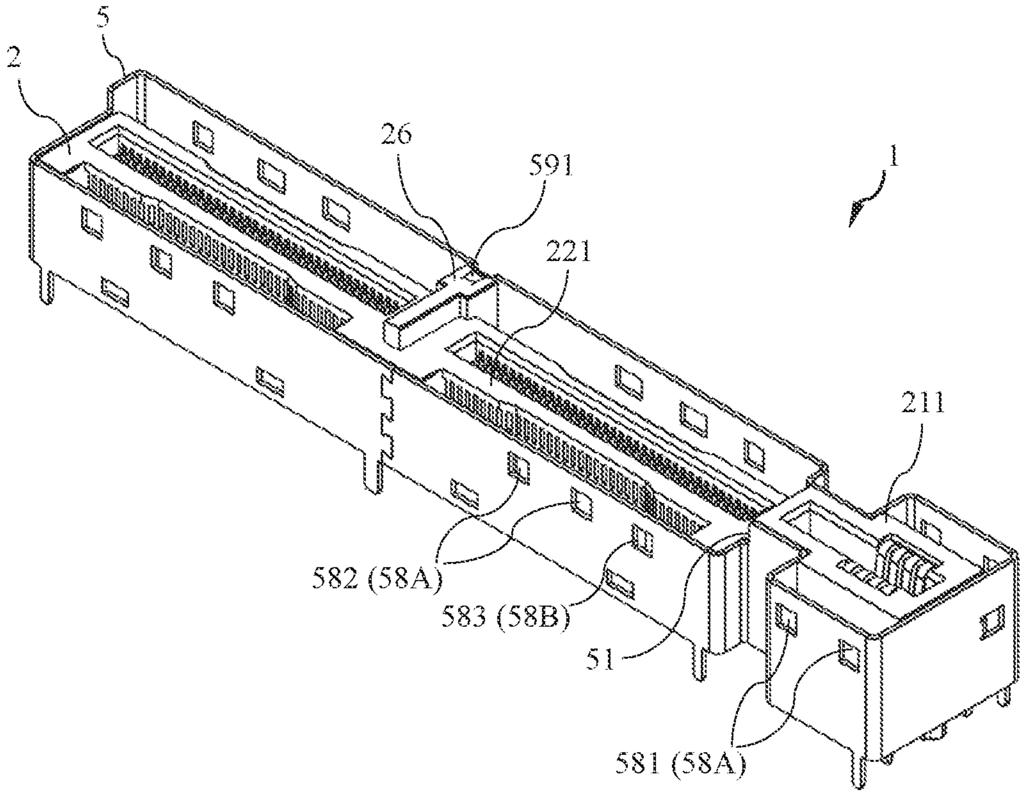
Figure 6:
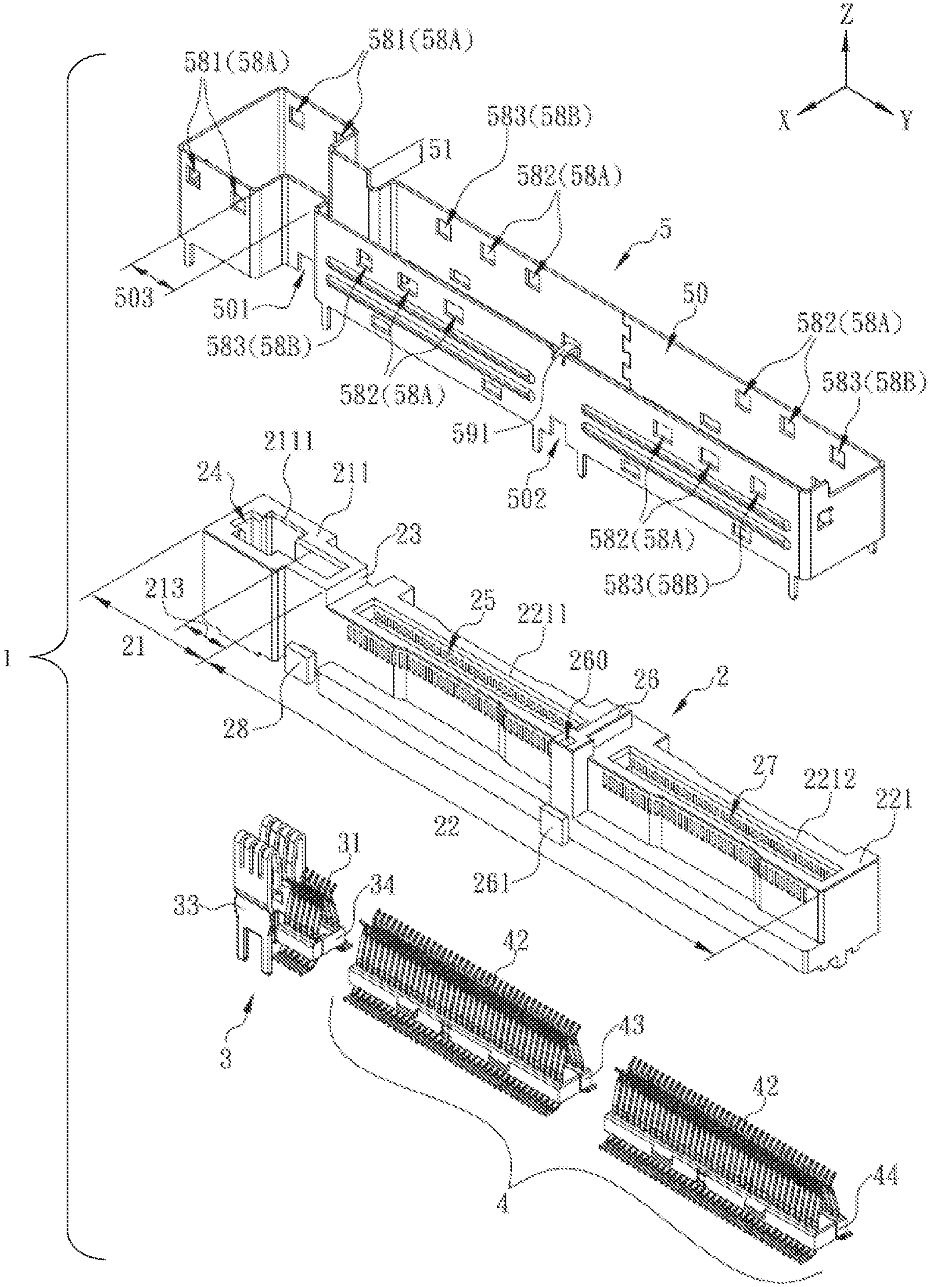
FIG. 6 shows the connector of FIG. 5A in a partially disassembled state.
Figure 7:
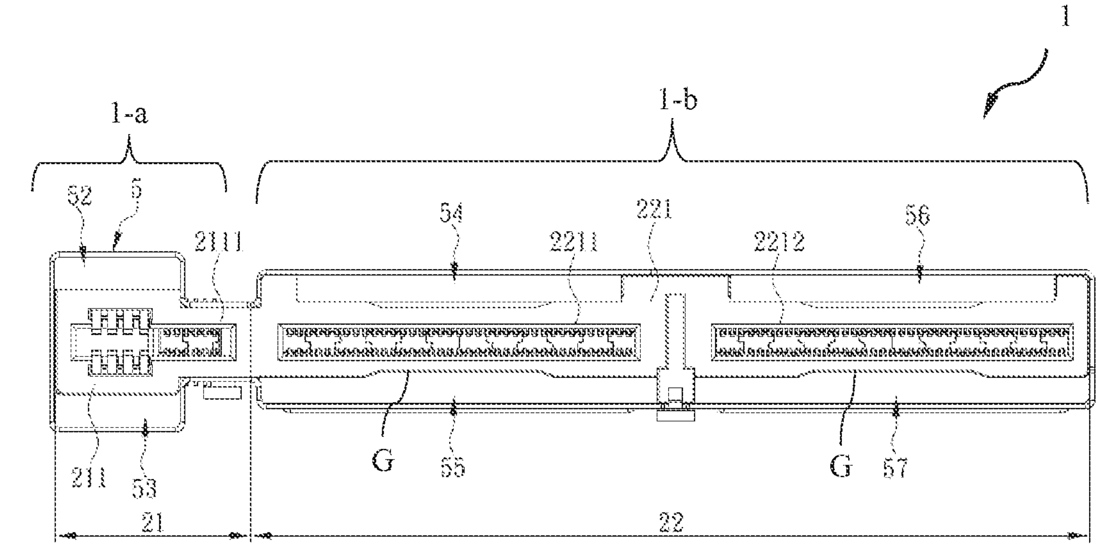
FIGS. 7 and 8 show top plan views of the connector of FIG. 5A.
Figure 8:
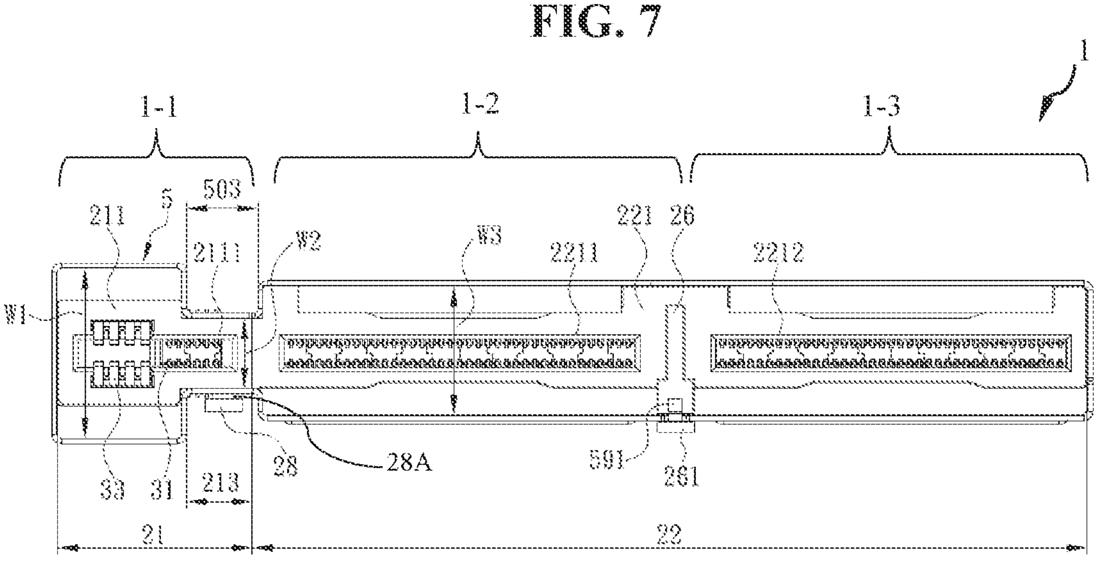
Figure 9:
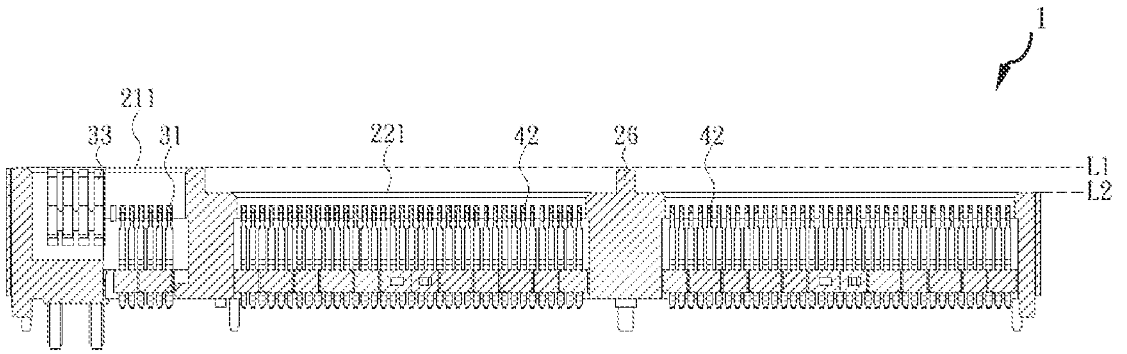
FIG. 9 shows a cross-sectional view of the connector of FIG. 5A.

FIGS. 5A and 5B show a top front perspective view and a top rear perspective view, respectively, of an electrical connector 1, according to some embodiments of the technology disclosed herein. The connector 1 may be a receptacle connector configured to physically receive and electrically contact one or more portions of a plug connector when mated with the plug connector. FIG. 6 shows the connector 1 of FIG. 5A in a partially disassembled state. FIGS. 7 and 8 show top plan views of the connector 1 of FIG. 5A. FIG. 9 shows a cross-sectional view of the connector 1 of FIG. 5A. The connector 1 may be referred to as a board connector and may be configured to make electrical contact with one or more edges of one or more boards (e.g., at least one PCB). FIGS. 5A through 9 depict a non-limiting example of a second connector design of the present technology. The connector 1 may have similarities to the connector A described above. To avoid redundancy, features that are similar between the connector A and the connector 1 may not be described in detail for the connector 1.

According to some embodiments of the present technology, the electrical connector 1 may be comprised of an insulative body 2 and a shell 5. The insulative body 2 may be comprised of a first body portion 21 and a second body portion 22 (see FIG. 6). The first and second body portions 21, 22 may be comprised of first and second mating surfaces 211, 221, respectively, as shown in FIGS. 5A and 5B. The first and second mating surfaces 211, 221 may face in a same direction and may be configured to face a mating connector when the connector 1 and the mating connector are mated. In some embodiments, the first mating surface 211 may be on a first plane L1 and the second mating surface 221 may be one a second plane L2 different from the first plane L1, as shown in FIG. 9. In some embodiments, a vertical height of the first mating surface 211 may be represented by the first plane L1 and may be greater than a vertical height of the second mating surface 221, which may be represented by the second plane L2, such that a shoulder 23 joins the first and second mating surfaces 211, 221. The vertical heights may be dimensions parallel to a Z direction of the connector 1 (see FIG. 6). In some other embodiments (not shown), the vertical height of the first mating surface 211 may be less than the vertical height of the second mating surface 221.

According to some embodiments of the present technology, the first mating surface 211 may be provided with a first mating interface 2111, and the second mating surface 221 may be provided with at least one mating interface. For example, as shown in FIG. 5A, the second mating interface 221 may be comprised of a second mating interface 2211 and a third mating interface 2212.

According to some embodiments of the technology disclosed herein, the electrical connector 1 may be identified as a multi-segment connector. In some embodiments, the first body portion 21 may correspond to a first segment 1-*a* of the electrical connector 1 and the second body portion 22 may correspond to a second segment 1-*b* of the connector 1, as depicted in FIG. 7. In some embodiments, each of the mating interfaces 2111, 2211, 2212 may correspond to a segment of the connector 1, with the first mating interface 2111 of the first body portion 21 corresponding to a first segment 1-1, and with the second and third mating interfaces 2211, 2212 of the second body portion 22 corresponding to second and third segments 1-2, 1-3, respectively.

According to some embodiments of the present technology, the first mating interface 2111 may be comprised of a first accommodating space 24 formed of a recess that extends from the first mating surface 211 into the first body portion 21 and that is configured to receive a first protruding portion of a mating connector when the connector 1 and the mating connected are mated. The second mating interface 2211 may be comprised of a second accommodating space 25 formed of a recess that extends from the second mating surface 221 into the second body portion 22 and that is configured to receive a second protruding portion of the mating connector when the connector 1 and the mating connected are mated. The third mating interface 2212 may be comprised of a third accommodating space 27 formed of a recess that extends from the second mating surface 221 into the second body portion 22 and that is configured to receive a third protruding portion of the mating connector when the connector 1 and the mating connected are mated. As will be appreciated, although the electrical connector 1 is shown in FIGS. 5A and 5B to have three accommodating spaces 24, 25, 27, in some embodiments the connector 1 may have two accommodating spaces or more than three accommodating spaces. Similarly, although the connector 1 is shown to have two mating surfaces 211, 221, in some embodiments the connector 1 may have one or more additional mating surfaces, which may be at one or more vertical heights different from the vertical heights of the two mating surfaces 211, 221 or which may be at one or more vertical heights same as the vertical height of the first mating surface 211 and/or the vertical height of the second mating surface 221.

According to some embodiments of the present technology, a longitudinal length of the first mating interface 2111 may be different from a longitudinal length of the second mating interface 2211 and/or a longitudinal length of the third mating interface 2212. The longitudinal lengths may be dimensions parallel to a Y direction of the connector 1 (see FIG. 6). In some other embodiments, the longitudinal length of the first mating interface 2111 may be smaller than the longitudinal lengths of each of the second and third mating interfaces 2211, 2212. In some embodiments, the longitudinal lengths of the first, second, and third mating interfaces 2111, 2211, 2212 may be equal to each other.

According to some embodiments of the technology disclosed herein, the first body portion 21 and the second body portion 22 of the insulative body 2 may be integrally formed as a single unit (e.g., by molding) and may be installed in the shell 5 as one piece in a single installation operation. In some other embodiments, the first body portion 21 and the second body portion 22 may be discrete units of the insulative body 2 and may be installed in the shell 5 one at a time, in two or more different installation operations, or may be assembled together before being installed in the shell 5 in a single installation operation. For example, the insulative body 2 may be comprised of three or more segments, such as individual units for the first, second, and third mating interfaces 2111, 2211, 2212, as noted above. The individual units may be installed in the shell 5 one at a time or may be assembled together before being installed in the shell 5. In some embodiments, the shell 5 may be formed of a conductive material (e.g., metal) and my function to prevent the insulative body 2 and the electrical connector 1 from experiencing electromagnetic interference (EMI), which may adversely affect operation of the connector 1. For example, the shell 5 may be mounted on a PCB and may be connected to a ground trace on the PCB, thus grounding the shell 5.

According to some embodiments of the technology disclosed herein, the first body portion 21 may be provided with a body clasping portion 28 located near a bottom edge of a front surface of the first body portion 21, as shown in FIGS. 5A, 6, and 8. In some embodiments, the body clasping portion 28 may project perpendicularly from the front surface of the first body portion 21. In some embodiments, another body clasping portion (not shown) may be provided on a rear surface of the first body portion 21 (e.g., opposite the body clasping portion on the front surface).

According to some embodiments of the present technology, the second body portion 22 of the insulative body 2 may be provided with a protrusion 26 that extends outward from the mating surface 221 in a direction parallel to the Z direction. In some embodiments, the protrusion 26 may also extend outward from a front surface of the second body portion 22, in a direction parallel to an X direction of the electrical connector 1 (see FIG. 6). The protrusion 26 may be located between the second mating interface 2211 and the third mating interface 2212 (see FIG. 8). A top surface of the protrusion 26 may be provided with a hole 260 configured to receive a portion of the shell 5, as discussed below. The protrusion 26 may also be provided with a protrusion clasping portion 261 configured to engage with the shell 5. In some embodiments, the protrusion clasping portion 261 may project perpendicularly from a front surface of the insulative body 2 (e.g., from a front surface of the protrusion 26). Although the body clasping portion 28 and the protrusion clasping portion 261 are shown to extend outward from the insulative body 2, in some embodiments the body clasping portion 28 and/or the protrusion clasping portion 261 may be a recess or groove in the insulative body 2 configured to engage with corresponding protrusion of a mating connector.

Referring to FIGS. 6 through 8, the shell 5 may bound an assembly space 50 in which the insulative body 2 may be disposed when the shell 5 and the insulative body 2 are assembled together. Once assembled, the insulative body 2 and the shell 5 may have a fixed position relative to each other. According to some embodiments of the present technology, the shell 5 may have a plurality of widths as measured in directions parallel to the X direction. In some embodiments, the shell 5 may have three different widths, as shown in FIG. 8: a first shell width W1 and a second shell width W2 in regions corresponding to the first body portion 21 of the insulative body 2, and a third shell width W3 in a region corresponding to the second body portion 22 of the insulative body 2. In FIG. 8, the region with W1 may be towards a left end of the electrical connector 1, the region with W3 may be towards a right end of the connector 1, and a region with W2 may be between W1 and W3. In some embodiments, W1 may be greater than W2 (i.e., W1>W2), such that in a plan view the first body portion 21 may have a T shape. In some embodiments, W3 may be greater than W2 (i.e., W3>W2), such that the shell 5 may have a relatively narrower shell neck 503 between left and right ends of the shell 5, as shown in FIGS. 6 and 8. In some embodiments, W1 may be greater than W3, and W3 may be greater than W2 (i.e., W1>W3>W2), such that the shell neck 503 may be between regions of different widths. In some embodiments, W1 and W3 may have a same width that is greater than W2 (i.e., W1=W3>W2). In some embodiments, W1 may be greater than W2 but less than W3 (i.e., W3>W1>W2). In some embodiments, W2 and W3 may have a same width that is less than W1 (i.e., W1>W2=W3). In some embodiments, W2 and W3 may have a same width that is greater than W1 (i.e., W1<W2=W3).

As noted above, the regions of the shell 5 having the first and second shell widths W1, W2 may correspond to the first body portion 21 of the insulative body 2. According to some embodiments of the present technology, the first body portion 21 may be comprised of an end section and a relatively narrower body neck 213, as shown in FIG. 8. The body neck 213 may be shaped and sized to fit snugly in the shell neck 503 of the shell 5 and may even be in contact with front and rear sides of the shell 5 at the shell neck 503 when the shell 5 and the insulative body 2 are assembled together. That is, the body neck 213 may have a width that is nearly W2 such that there may be no appreciable gap separating the body neck 213 from the shell neck 503. In contrast, the end section of the first body portion 21 may have a width that is greater than W2 and less than W1, with the width of the end section being sufficiently less than W1 that when the shell 5 and the insulative body 2 are assembled together one or more portions of the shell 5 may be spaced apart from the end section of the insulative body 2. In some embodiments, a front surface of the end section of the first body portion 21 may be spaced apart from the shell 5 by a first plugging space 53, and a rear surface of the end section of the first body portion 21 may be spaced apart from the shell 5 by a second plugging space 52, as shown in FIG. 7. In some embodiments, a length of the body neck 213, in a direction parallel to the Y direction, is equal to or substantially equal to a length of the shell neck 503. In some embodiments, a left end of the first body portion 21 may abut a left side of the shell 5 such that there may be no appreciable gap in between.

As noted above, the vertical height of the first body portion 21 may be represented by L1 and may be greater than L2, which may represent the vertical height of the second body portion 22 (see FIG. 6). According to some embodiments of the present technology, the regions of the shell 5 having the widths W1, W2 may have a vertical height equal to or substantially equal to the vertical height L1 of the first body portion 21. In some embodiments, the region of the shell 5 having the width W3 may have a plurality of different vertical heights. In some embodiments, the region of the shell 5 having the width W3 may have a front portion having a vertical height equal to or substantially equal to the vertical height L1 of the first body portion 21, and may have a rear portion having a vertical height equal to or substantially equal to the vertical height L2 of the second body portion 22. In some embodiments, a rear side of the shell 5 may have a shell step 51 corresponding to a drop in the vertical height of the shell 5 from the vertical height corresponding to that of the first body portion 21 (L1) to the vertical height corresponding to that of the second body portion 22 (L2). In some embodiments, the shell step 51 may be a vertical step located at a right end on a rear side of the shell neck 503, as shown in FIG. 6, such that the shell step 51 may have an edge aligned with an edge of the shoulder 23 joining the first and second mating surfaces 211, 221 of the first and second body portions 21, 22 of the insulative body 2. In some embodiments, the shell 5 may have another portion where there is a change in vertical height from the vertical height corresponding to that of the first body portion 21 (L1) to the vertical height corresponding to that of the second body portion 22 (L2), and this other portion need not be at a location corresponding to the shoulder 23 of the body 2. In some embodiments, the other portion may be located at a right end of the shell 5 and the change may be, e.g., a vertical step, as shown in FIG. 6. As will be appreciated, the change may take other forms, such as, a non-vertical slope, multiple steps, etc., and need not be a vertical step.

According to some embodiments of the present technology, one or more parts of the insulative body 2 may be spaced apart from the shell 5 and may form plugging spaces between the insulative body 2 and the shell 5. As discussed above, front and rear surfaces of the first body portion 21 of the insulative body 2 may be spaced apart from the shell 5 such that the first plugging space 53 is located between the front surface of the first body portion 21 and the shell 5, and such that the second plugging space 52 is located between the rear surface of the first body portion 21 and the shell 5. In some embodiments, front and rear surfaces of the second body portion 22 of the insulative body 2 may be spaced from the shell 5 such that a third plugging space 54, a fourth plugging space 55, a fifth plugging space 56, and a sixth plugging space 57 may be formed between the second body portion 22 and the shell 5, as shown in FIG. 7. In some embodiments, the electrical connector 1 may have fewer than six plugging spaces or more than six plugging spaces.

According to some embodiments of the present technology, as shown in FIG. 7, the first and second plugging spaces 53, 52 may be on opposite sides of the first body portion 21 of the insulative body 2 and may have equal or substantially equal lengths, as measured in directions parallel to the Y direction. In some embodiments, the third plugging space 54 and the fourth plugging space 55 may be on opposite sides of the second body portion 22, with the third plugging space 54 being adjacent a rear surface of the second body portion 22 and with the fourth plugging space 55 being adjacent a front surface of the second body portion 22. In some embodiments, the third and fourth plugging spaces 54, 55 may be directly opposite each other, with the third plugging space 54 having a length that is relatively shorter than that of the fourth plugging space 55. Similarly, in some embodiments, the fifth plugging space 56 and the sixth plugging space 57 may be on opposite sides of the second body portion 22, with the fifth plugging space 56 being adjacent the rear surface of the second body portion 22 and with the sixth plugging space 57 being adjacent the front surface of the second body portion 22. In some embodiments, the fifth and sixth plugging spaces 56, 57 may be directly opposite each other, with the fifth plugging space 56 having a length that is relatively shorter than that of the sixth plugging space 57. In some embodiments, the electrical connector 1 may be provided with at least one plugging space only on one side. For example, one or more plugging spaces may be provided between a front surface of the insulative body 2 and the shell 5 while the rear surface of the insulative body 2 may abut the shell 5 such that no appreciable gap is present. In some embodiments, the socket connector 1 may be provided with only one plugging space, for example, only the fourth plugging space 55. In some embodiments, the electrical connector 1 may also be provided with no plugging space, i.e., outer surfaces of the insulative body 2 may abut the shell 5. In some embodiments, two or more plugging spaces of the electrical connector 1 may be connected to each other. For example, the third plugging space 54 may be connected to the fifth plugging space 56, and the fourth plugging space 55 may be connected to the sixth plugging space 57. One or more portions of the shell neck 503 may also be spaced from a corresponding one or more portions of the body neck 213, to form plugging spaces. The difference in lengths of the front plugging spaces (i.e., the fourth and sixth plugging spaces 55, 57) and the rear plugging spaces (i.e., the third and fifth plugging spaces 54, 56) may prevent an operator from erroneously inserting a portion of a mating connector into the electrical connector 1 when there is front-rear misorientation, i.e., when the mating connector is misoriented by 180°.

According to some embodiments of the technology disclosed herein, the electrical connector 1 may be assembled by inserting the insulative body 2 into the assembly space 50 of the shell 5 through a bottom of the shell 5. In some embodiments, the shell 5 may be provided with a hook 591, which may be a piece of the shell 5 that is bent inward toward the assembly space 50. During insertion, the hook 591 may extend into the hole 260 in the insulative body 2 and the body clasping portion 28 may clasp to the first shell clasping portion 501. For example, the first shell clasping portion 501 may be a recessed edge, and the body clasping portion 28 may include a channel 28A in which the recessed edge of the first shell clasping portion 501 sits. Once inserted, the protrusion clasping portion 261 may be clasped with a second shell clasping portion 502, such that the body clasping portion 28 and the protrusion clasping portion 261 may each be exposed on an external side of the shell 5, so that the insulative body 2 may be set to a predetermined position relative to the shell 5, and so that the mating surfaces 211, 221 of the insulative body 2 may not protrude excessively from a top edge of the shell 5 (e.g., due to carelessness during the insertion).

Although FIG. 6 shows that the first and second shell clasping portions 501, 502 to be cutouts or recessed spaces in the shell 5, and although the body clasping portion 28 and the protrusion clasping portion 261 are shown to be protruding objects, in some embodiments one or both of the first and second shell clasping portions 501, 502 may be protrusions and one or both of the body clasping portion 28 and the protrusion clasping portion 261 may be recesses configured to engage with the first and second shell clasping portions 501, 502, to set a relative position of the insulative body 2 and the shell 5. In some embodiments, the electrical connector 1 may be provided with either the body clasping portion 28 engaged with the first shell clasping portion 501 or the protrusion clasping portion 261 engaged with the second shell clasping portion 502, but not both. Although the electrical connector 1 is shown to have the body clasping portion 28 and the protrusion clasping portion 261 only on the front side (see FIG. 8), in some embodiments the body clasping portion 28 and the protrusion clasping portion 261 may instead be on the rear side or on both the front and rear sides of the connector 1. In some embodiments, the first and second shell clasping portions 501, 502 may be provided on the front side as well as on the rear side of the shell 5.

According to some embodiments of the present technology, the front and rear sides of the shell 5 may each be provided with a first assembly hole set 58A and a second assembly hole set 58B, as shown in FIGS. 5 and 6. In some embodiments, the first assembly hole set 58A may be comprised of two first assembly holes 581 and four second assembly holes 582. In some embodiments, the second assembly hole set 58B may be comprised of two third assembly holes 583. In some embodiments, the first plugging space 52 may be connected to the first assembly holes 581 of the first assembly hole set 58A on the rear side of the shell 5, and the second plugging space 53 may be connected to the first assembly holes 581 of the first assembly hole set 58A on the front side of the shell 5. In some embodiments, each of the third plugging space 54 and the fifth plugging space 56 may be connected to a respective pair of the second assembly holes 582 of the second assembly hole set 58B on the rear side of the shell 5, and each of the fourth plugging space 55 and the sixth plugging space 57 may be connected to a respective pair of the second assembly holes 582 of the second assembly hole set 58B on the front side of the shell 5, as shown in FIGS. 5 and 6. In some embodiments, the first assembly holes 581 may face front and rear walls of the first body portion 21 of the insulative body 2, towards a left side of the electrical connector 1 (e.g., leftwards of the shoulder 23 of the insulative body 2). In some embodiments, the second assembly holes 582 may face front and rear walls of the second body portion 22 of the insulative body 2, towards a right side of the connector 1 (e.g., rightwards of the shoulder 23).

According to some embodiments of the present technology, a vertical height of the first assembly holes 581 on the front side of the shell 5, as measured from a bottom edge of the shell 5 in a direction parallel to the Z direction, may be equal to or substantially equal to a vertical height of the first assembly holes 581 on the rear side of the shell 5. In some embodiments, the first assembly holes 581 one the front side of the shell 5 may be symmetrically opposite (e.g., a mirror image) the first assembly holes 581 on the rear side of the shell 5. In contrast, a vertical height of the second assembly holes 582 on the front side of the shell 5 may be greater than a vertical height of the second assembly holes 582 on the rear side of the shell 5. As described above, the shell 5 may be comprised of the shell step 51 (see FIG. 6), such that a vertical height of the shell 5 leftward of the shell step 51, as measured in a direction parallel to the Z direction from a top edge of the shell 5 to the bottom edge of the shell 5, may be greater than a vertical height of the shell 5 rightward of the shell step 51. In some embodiments, a vertical distance from the top edge of the front side of the shell 5 to the second assembly holes 582 on the front side of the shell 5 may be equal to or substantially equal to a vertical distance from the top edge of the rear side of the shell 5 to the second assembly holes 582 on the rear side of the shell 5, resulting in the vertical height of the second assembly holes 582 on the front side of the shell 5 being greater than the vertical height of the second assembly holes 582 on the rear side of the shell 5. Similarly, in some embodiments, a vertical height of the third assembly holes 583 on the front side of the shell 5 may be greater than a vertical height of the third assembly holes 583 on the rear side of the shell 5. In some embodiments, the first, second, and third assembly holes 581, 582, 583 may be engagement holes configured to engage with engagement portions of a mating connector when the mating connector and the electrical connector 1 are mated. For example, the engagement portions may be bumps and/or other engagement structures on surfaces of alignment legs configured to extend into the first, second, third, fourth, fifth, and sixth plugging spaces, 52, 53, 54, 55, 56, 57, when the mating connector is mated with the electrical connector 1. A beneficial aspect of providing a plurality of different types of assembly holes is that the connector 1 may be used with different types of mating connectors. For example, the connector 1 may be receptacle connector configured to mate with a first plug connector having bumps and/or other engagement structures corresponding to the first and third assembly holes 581, 583 but not the second assembly holes 582 or with a second plug connector having bumps and/or other engagement structures corresponding to the first and second assembly holes 581, 582 but not the third assembly holes 583.

As will be appreciated, the shell 5 may have other assembly-hole arrangements not specifically illustrated in the drawings. For example, the shell 5 may be provided with the first and second assembly hole sets 58A, 58B only on the front side or only on the rear side of the shell 5. In another example, the first assembly hole set 58A and/or the second assembly hole set 58B of the shell 5 may be comprised of only one assembly hole or may be comprised of a plurality of assembly holes different from what is shown in the drawings. It should be understood that the shell 5 may be configured with other assembly-hole arrangements suitable to engage with bumps and/or other engagement structures of a mating connector, to fix a relative position of the electrical connector 1 and the mating connector when mated to each other.

According to some embodiments of the technology disclosed herein, a first terminal set 3 may be disposed in the first body portion 21 of the insulative body 2, as shown in FIGS. 6, 8, and 9. For example, the first terminal set may be embedded in the first body portion 21. In some embodiments, the first terminal set 3 may be comprised of a plurality of first metal terminals 31 and a plurality of third metal terminals 33. The first metal terminals 31 may be signal terminals configured to conduct electrical signals (e.g., voltage signals). The third metal terminals 33 may be power supply terminals configured transfer electrical power (e.g., current at a predetermined voltage. The first metal terminals 31 may be arranged on a first terminal base 34 such that two opposite ends of the first metal terminals 31 are exposed on opposite sides of the first terminal base 34, as shown in FIG. 6. In some embodiments, the third metal terminals 33 may each be comprised of a plate that is connected to the first terminal base 34 in which the first metal terminals 31 are disposed, to form the first terminal set 3. In some other embodiments, the first terminal set 3 may be provided with metal terminals of a single type (e.g., only signal terminals, or only power terminals, or only ground terminals, etc.). Contact ends of the first and third metal terminals 31, 33 may be exposed in the first accommodating space 24 of the insulative body 2, and mounting ends of the first and third metal terminals 31, 33 may extend from a bottom surface of the insulative body 2 and may be configured to be mounted on a carrier (e.g., a PCB).

According to some embodiments of the present technology, a second terminal set 4 may be disposed in the second body portion 22 of the insulative body 2, as shown in FIGS. 6, 8, and 9. The second terminal set 4 may be comprised of a plurality of second metal terminals 42 arranged on a second terminal base 43 and a third terminal base 44. As shown in FIG. 6, a first group of the second metal terminals 42 may be arranged on the second terminal base 43 such that two opposite ends of the second metal terminals 42 of the first group are exposed on opposite sides of the second terminal base 43. Similarly, a second group of the second metal terminals 42 may be arranged on the third terminal base 44 such that two opposite ends of the second metal terminals 42 of the second group are exposed on opposite sides of the third terminal base 44. Contact ends of the first group of the second metal terminals 42 may be exposed in the second accommodating space 25 of the insulative body 2, and contact ends of the second group of the second metal terminals 42 may be exposed in the third accommodating space 27 of the insulative body 2. Mounting ends of the second metal terminals 42 may extend from a bottom surface of the insulative body 2 and may be configured to be mounted on a carrier (e.g., a PCB).

According to some embodiments of the present technology, the contact ends of the third metal terminals 33 of the first terminal set 3 may be located on a first XY plane, and the contact ends of the second metal terminals 42 in the second terminal set 4 may be located on a second XY plane different from the first XY plane, as shown in FIG. 9. Stated differently, a vertical height of third metal terminals 33 may be greater than a vertical height of the second metal terminals 42. In some embodiments, the contact ends of the first metal terminals 31 may be located on the first XY plane, same as the contact ends of the second metal terminals 42, and a vertical height of the first metal terminals 31 may be equal to or substantially equal to the vertical height of the second metal terminals 42. In some embodiments, the first terminal base 34, the second terminal base 43, and the third terminal base 44 may be separate elements; in some other embodiments the first, second, and third terminal bases 34, 43, 44 may be contiguous portions of a single element and may be formed as one piece around the first and second metal terminals 31, 42 (e.g., by injection molding).

According to some embodiments of the present technology, the first and second body portions 21, 22 of the insulative body 2 may be contiguous portions of a single element. In some other embodiments, the first and second body portions 21, 22 may be separate elements that are held together by the shell 5 and/or by fastening means (e.g., fusing, glue, one or more clips, etc.). In these other embodiments, a first segment of the electrical connector 1, which may be comprised of the first terminal set 3 disposed in the first body portion 21, may be formed in separate manufacturing operations from manufacturing operations to form a second segment of the connector 1, which may be comprised of the second terminal set 4 disposed in the second body portion 22. The first and second segments of the connector 1 may be joined together by the shell 5 and/or by fastening means (e.g., fusing, glue, one or more clips, etc.). A connector design in which the first and second body portions 21, 22 are separate elements that are joined together mechanically is described below.

According to some embodiments of the present technology, the third metal terminals 33 and the first metal terminals 31 may not combined as one unit piece (e.g., via attachment to the first terminal base 34 but instead the third metal terminals 33 may be disposed separately from the first metal terminals 31. In some embodiments, the first and third metal terminals 31, 33 may not be commonly exposed in the first accommodating space 24 of the first body portion 21 of the insulative body 2. Instead, the first body portion 21 may be comprised of an accommodating space in which the first metal terminals 31 are exposed and another accommodating space in which the third metal terminals 33 are exposed.

According to some embodiments of the present technology, the third metal terminals 33 may be disposed in the relatively wider end section of the first body portion 21 and at least a portion of the first metal terminals 31 may be disposed in the relatively narrower body neck 213 of the first body portion 21, as shown in FIG. 8. In some other embodiments, the first and third metal terminals 31, 33 may be disposed in the relatively wider end section of the first body portion 21 and no terminal may be disposed the relatively narrower body neck 213.

According to some embodiments of the present technology, the first body portion 21 may be comprised of two first terminal sets 3, or may be comprised of two different terminal sets comprised of two different types of metal terminals (e.g., signal terminals, power terminals), or may be comprised of three different terminal sets comprised of three different types of metal terminals (e.g., signal terminals, power terminals, ground terminals).

As noted above, the difference in the lengths of the fourth and sixth plugging spaces 55, 57 on the front side of the electrical connector and the third and fifth plugging spaces 54, 56 on the rear side of the electrical may prevent front-rear misorientation of a mating connector when an operator tries to mate the mating connector with the electrical connector 1. The first through sixth plugging spaces 52, 53, 53, 55, 56, 57 also may prevent skewed mating of a mating connector with the connector 1. For example, the mating connector may be a plug connector comprised of a plurality of legs or protrusions configured to be inserted respectively in the first through sixth plugging spaces 52, 53, 53, 55, 56, 57 of the connector 1. If the mating connector is tilted or skewed relative to the connector, one or more of the legs may not be aligned with one or more corresponding ones of the first through sixth plugging spaces 52, 53, 53, 55, 56, 57 and movement of the mating connector toward the connector 1 may be prevented, thus allowing an operator to sense the positioning error before applying force to push the mating connector toward the connector 1 and consequently preventing the mating connector and/or the connector 1 from being damaged. Similarly, the presence of the narrow portion of the connector 1, corresponding to the body neck 213 and the shell neck 503, allows operator to ascertain quickly by sight and/or by touch the left and right sides of the connector 1, which may be particularly advantageous in blind mating operations when the operator must align the mating connector without being able to see the connector 1 during mating.

Third Connector Design

Figure 10:
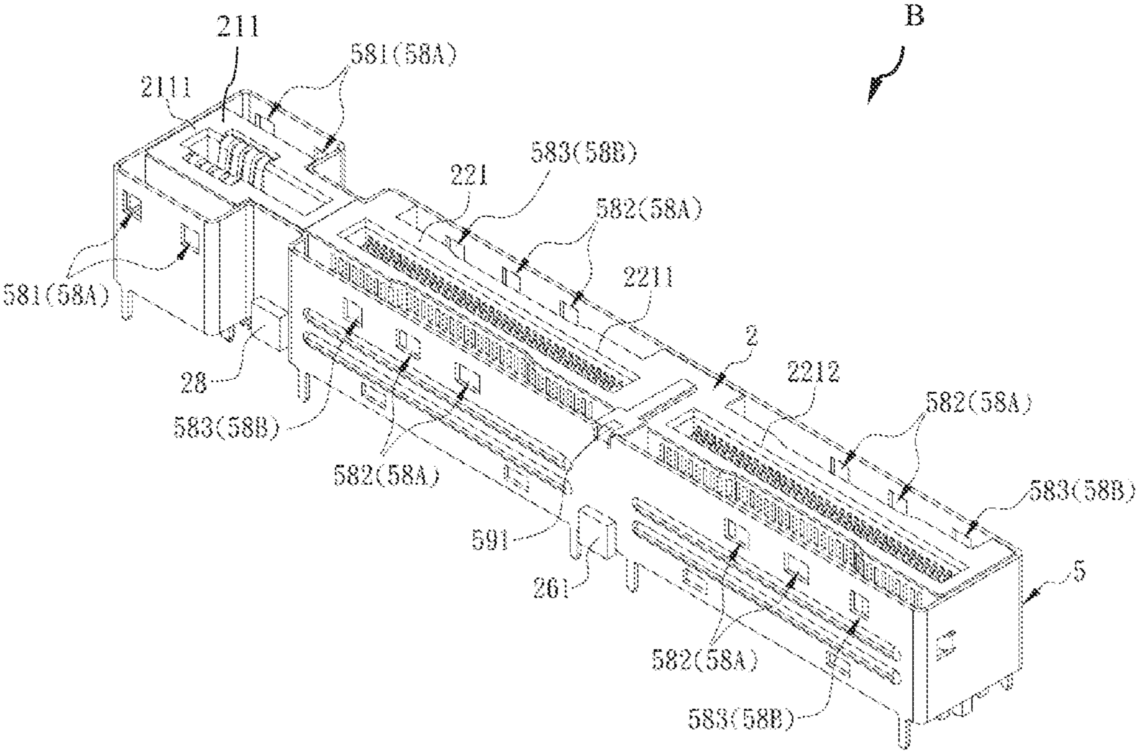
FIG. 10 shows a top front perspective view of an electrical connector, according to some embodiments of the present technology.

FIG. 10 shows a top front perspective view of an electrical connector B according to some embodiments of the present technology. The connector B may be a receptacle connector configured to physically receive and electrically contact a portion of a plug connector when mated with the plug connector, according to some embodiments of the technology disclosed herein. The connector B may be similar to the connector 1 described above. Therefore, to avoid redundant descriptions, the connector B will be described by comparing differences between the two connectors B, 1. FIG. 10 depicts a non-limiting example of a third connector design of the present technology.

According to some embodiments of the present technology, the electrical connector B may be comprised of an insulative body 2 having first and second body portions 21, 22 and a shell 5 in which the insulative body 2 is disposed. For example, the shell 5 may encircle the insulative body 2. The first and second body portions 21, 22 may be comprised of first and second mating surfaces 211, 221, which may face in a same direction and may be configured to face a mating connector when the connector B and the mating connector are mated. Unlike the electrical connector 1 shown in FIG. 5, the first mating surface 211 and the second mating surface 221 may be coplanar. As such, the connector B may not have a shoulder between the first and second body portions 21, 22, unlike the shoulder 23 resulting from the difference between the height L1 of the first mating surface 211 and the height L2 of the second mating surface 221 in the connector 1 shown in FIG. 5. That is, in the connector B, L1=L2. In some embodiments, the shell 5 of the connector B may have a generally uniform vertical height. That is, the shell step 51 present in the connector 1 shown in FIG. 5 may not be present in the connector B, such that a vertical height of the shell 5 may be equal to or substantially equal to a vertical height of the first and second mating surfaces 211, 221 of the connector B.

Fourth Connector Design

Figure 11:
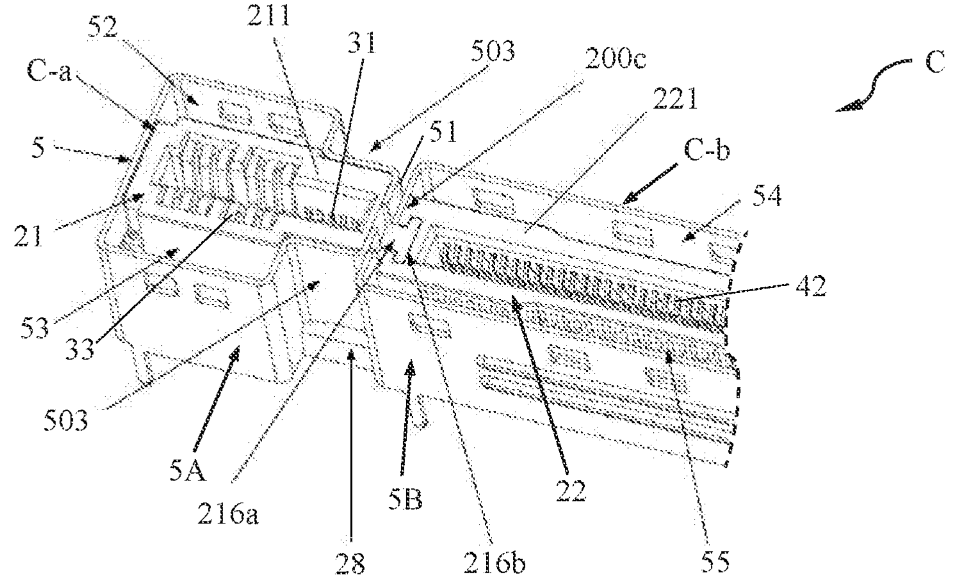
FIG. 11 shows a top front perspective view of a portion of an electrical connector, according to some embodiments of the present technology.
Figure 12:
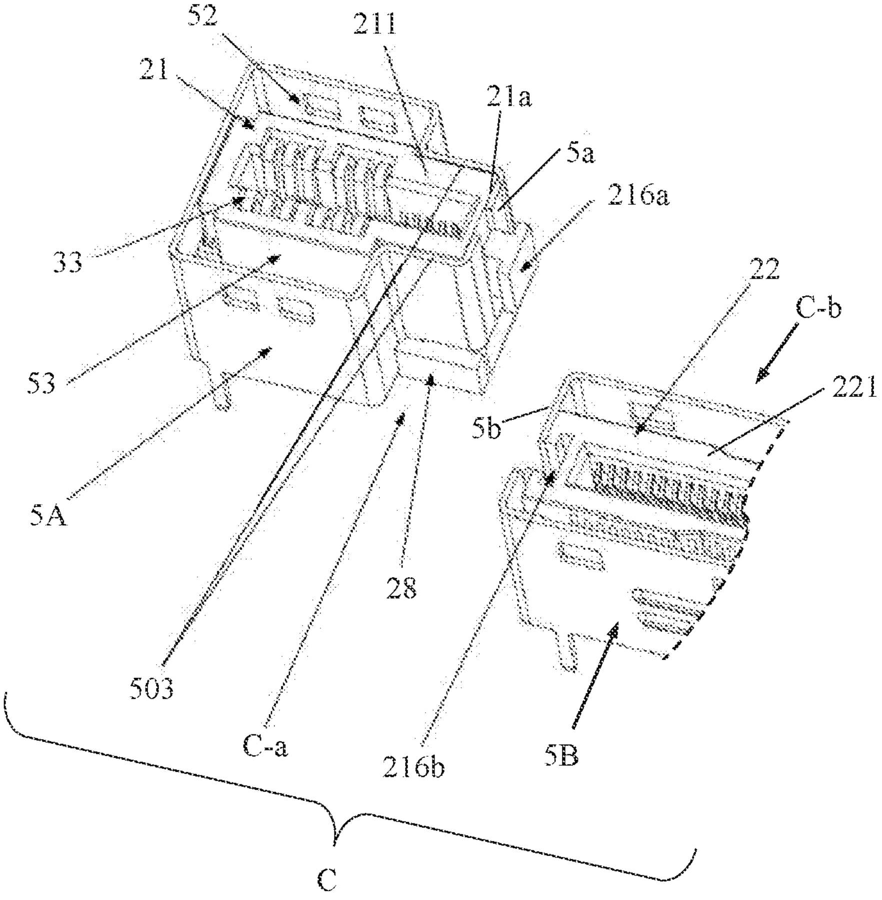
FIG. 12 shows the portion the connector of FIG. 11 in a partially disassembled state.

FIG. 11 shows a top front perspective view of a portion of an electrical connector C, according to some embodiments of the technology disclosed herein. FIG. 12 shows the portion the connector C in a partially disassembled state. A remainder of the connector C not shown in FIGS. 11 and 12 may have a same structure as that of the electrical connector 1 described above. The connector C may be, for example, a receptacle connector and may be configured to physically receive and electrically contact a portion of a plug connector when mated with the plug connector. Some features of the connector C may be similar to those of the electrical connector 1 described above. Therefore, to avoid redundant descriptions, the similar features will not be repeated for the connector C. FIGS. 11 and 12 depict a non-limiting example of a fourth connector design of the present technology.

According to some embodiments of the present technology, the electrical connector C may be comprised of a first segment C-a and a second segment C-b. The first and second segments C-a, C-b may be manufactured as separate components and joined together to form the connector C. In some embodiments, the connector C may resemble the electrical connector 1 (see FIG. 5A) when the first and second segments C-a, C-b are joined together.

According to some embodiments of the technology disclosed herein, the first segment C-a of the electrical connector C may include: a first body portion 21, a first shell portion 5A configured to surround the first body portion 21 at least partially, and a plurality of conductive terminals 31, 33 disposed in the first body portion 21 such that contact surfaces of the conductive terminals 31, 33 are exposed, as shown in FIG. 12. The first segment C-a of the connector C may resemble the first segment 1-*a* of the electrical connector 1 when the first and second segments C-a, C-b of the connector C are joined together. Similarly, in some embodiments, the second segment C-b may include: a second body portion 22, a second shell portion 5B configured to surround the second body portion 22 at least partially, and a plurality of conductive terminals 42 disposed in the second body portion 22 such that contact surfaces of the conductive terminals 42 are exposed, as shown in FIG. 12. The second segment C-b of the connector C may resemble the second segment 1-*b* of the connector 1 when the first and second segments C-a, C-b of the connector C are joined together. The first and second body portions 21, 22 of the first and second segments C-a, C-b may be insulative and, when joined together, the first and second body portions 21, 22 may resemble the insulative body 2 of the connector 1. The first body portion 21 may be comprised of an engagement protrusion 216*a* extending outwards from an external surface in a direction parallel to the Y direction. In some embodiments, the engagement protrusion 216*a* may be a T-shaped protrusion. The second body portion 22 may be comprised of an engagement recess 216*b* extending inwards from an external surface in a direction parallel to the Y direction. In some embodiments, the engagement recess 216*b* may be a T-shaped recess configured to latch with the T-shaped engagement protrusion 216*a* of the first body portion 21. For example, to join the first and second body portions 21, 22, the engagement protrusion 216*a* may be positioned above the engagement recess 216*b* and pushed together in a direction parallel to the Z direction. In some embodiments, the engagement recess 216*b* may not be part of the second body 11 portion but instead may be part of the first body portion 21 and, similarly, the engagement protrusion 216*a* may not be part of the first body portion 21 but instead may be part of the second body portion 22.

According to some embodiments of the present technology, the first and second shell portions 5A, 5B may be formed of metal. The first shell portion 5A may encircle the first body portion 21 except at the engagement protrusion 216*a*, which may extend beyond a first shell interface 5*a*, as shown in FIG. 12. That is, the first shell portion 5A may be a sleeve around the first body portion 21. The second shell portion 5B may be a sleeve encircling the second body portion 21 except at the engagement recess 216*b*, to provide an opening at which the engagement protrusion 216*a* may engage with the engagement recess 216*b*. In some embodiments, when the engagement protrusion 216*a* and the engagement recess 216*b* are fully engaged with each other, the first shell interface 5*a* of the first shell portion 5A may abut a second shell interface 5*b* of the second shell portion 5B, such that the first and second shell interfaces 5*a*, 5*b* may be disposed between the first and second body portions 21, 22 of the connector C. In some embodiments, a vertical height of a first mating surface 211 of the first body portion 21 may be equal to or substantially equal to a vertical height of the first shell portion 5A, similar to the electrical connectors A, B, 1 discussed above. In some embodiments, a vertical height of a second mating surface 221 of the second body portion 22 may be less than the vertical height of the first mating surface 211 of the first body portion 21, similar to the connector 1. In some embodiments, the second shell portion 5B may have a plurality of vertical heights, with a vertical height of a rear side of second shell portion 5B being equal to or substantially equal to the vertical height of the second mating surface 221 and with a vertical of a front side of the second shell portion 5B being equal to or substantially equal to the vertical height of the first shell portion 5A. In some embodiments, a shell step 51 may be present on a rear side of a shell neck 503, at a location where the first shell interface 5*a* abuts the second shell interface 5*b*.

Fifth Connector Design

Figure 13:
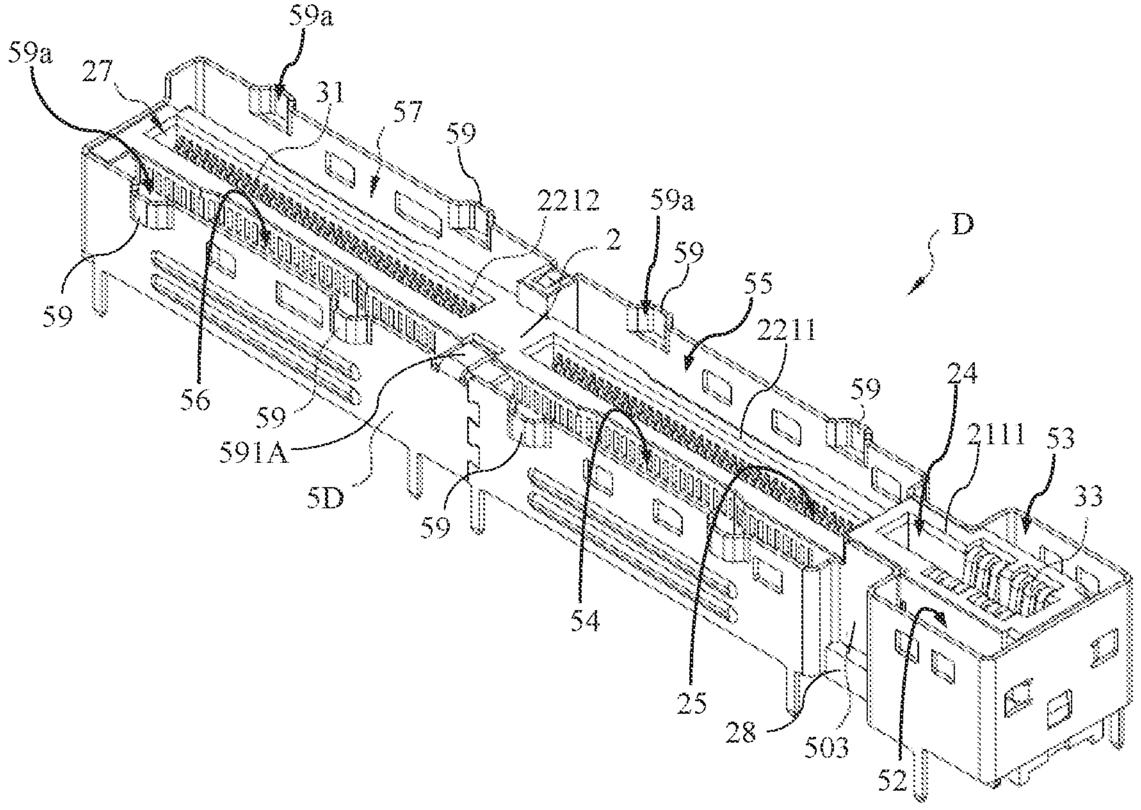
FIG. 13 shows a top rear perspective view of an electrical connector, according to some embodiments of the technology disclosed herein.
Figure 13A:
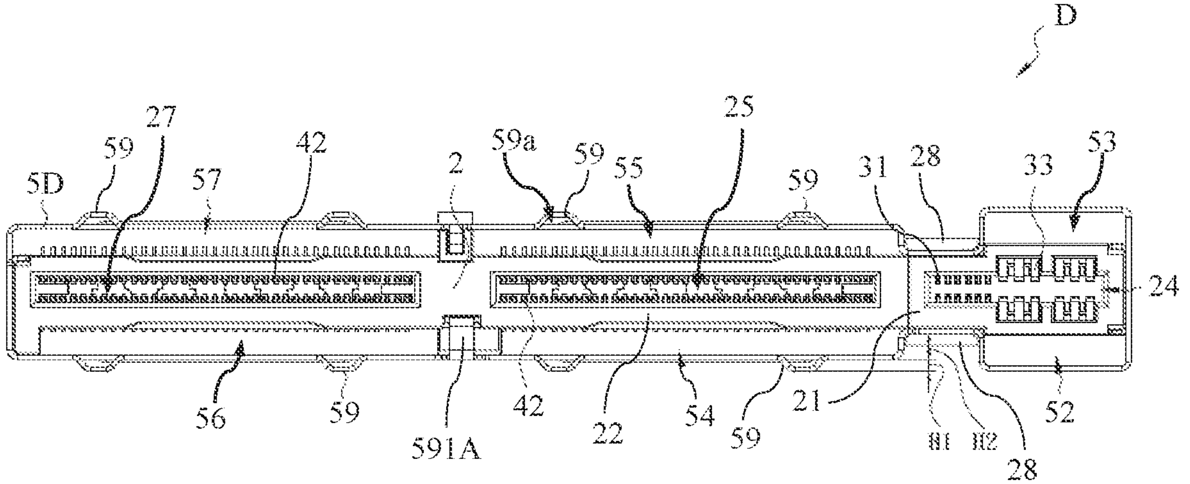
FIG. 13A shows a top plan view of the connector of FIG. 13.
Figure 13B:
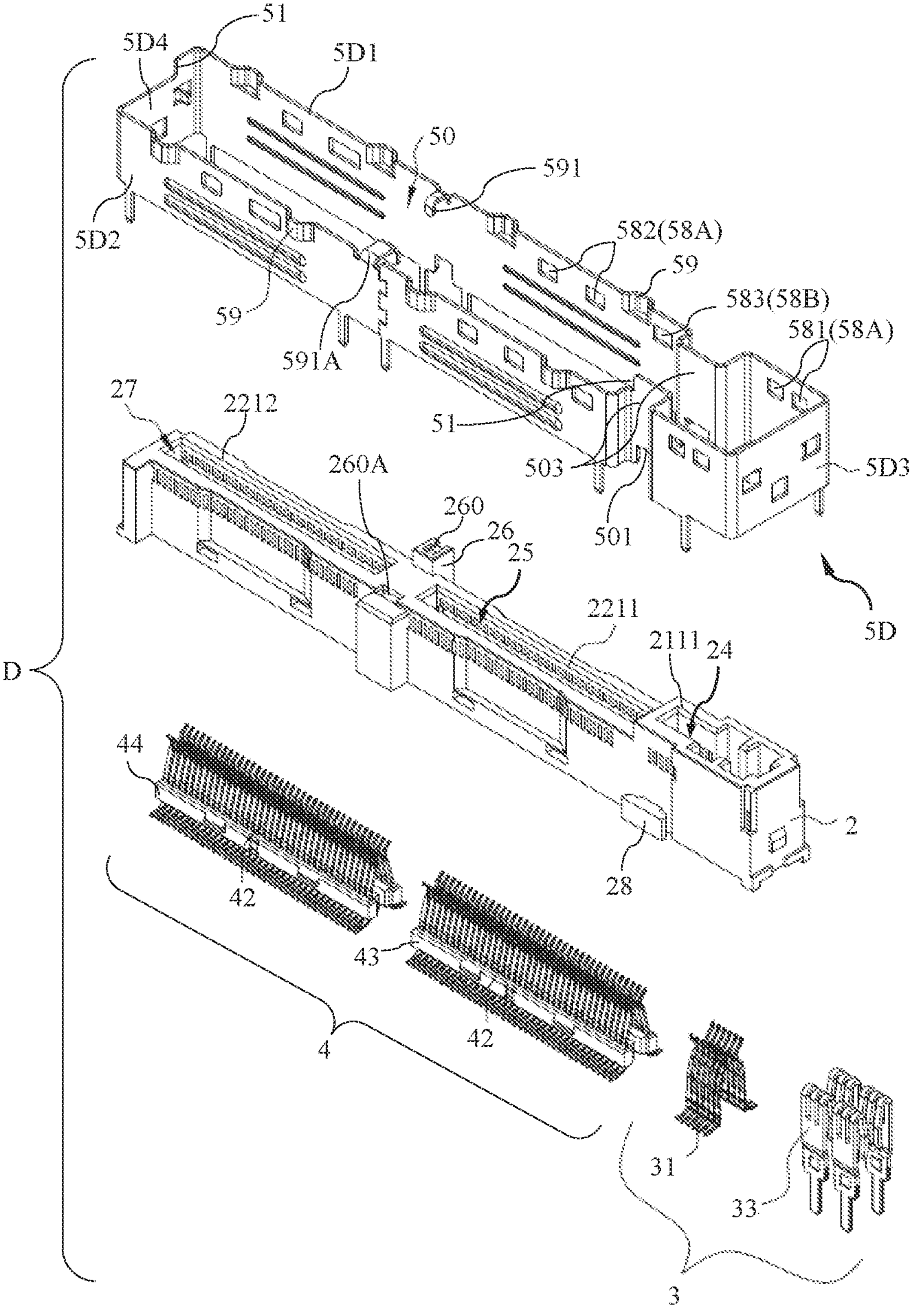
FIG. 13B shows the connector of FIG. 13 in a partially disassembled state.

FIG. 13 shows a top rear perspective view of an electrical connector D, according to some embodiments of the technology disclosed herein. FIG. 13A shows a top plan view of the connector D, and FIG. 13B shows the connector D in a partially disassembled state. FIGS. 13, 13A, and 13B depict a non-limiting example of a fifth connector design of the present technology. The connector D may be, for example, a receptacle connector and may be configured to physically receive and electrically contact a portion of a plug connector when mated with the plug connector. Some features of the connector D may be similar to those of the electrical connector 1 described above. Therefore, to avoid redundant descriptions, some of the similar features will not be described in detail for the connector D.

According to some embodiments of the present technology, the electrical connector D may be comprised of an insulative body 2 and a shell 5D encircling the insulative body 2. In some embodiments, the insulative body 2 of the connector D may be the same as the insulative body 2 of the electrical connector 1. The shell 5D, however, is different from the shell 5 of the connector 1, as described below.

According to some embodiments of the present technology, the first body portion 21 of the insulative body 2 may be provided with the body clasping portion 28 located near a bottom edge of a rear surface of the first body portion 21, as shown in FIGS. 13 and 13B. In some embodiments, the body clasping portion 28 may project perpendicularly from the rear surface of the first body portion 21. In some embodiments, another body clasping portion 28 may be provided on a front surface of the first body portion 21 (e.g., opposite the body clasping portion on the rear surface), as shown in FIG. 13A. In some embodiments, the insulative body 2 may be comprised of the first, second, and third accommodating spaces 24, 25, 27, which may be configured to receive therein first, second, and third boards or board portions of a mating connector, similar to the electrical connector 1. In some embodiments, the first and second terminals sets 3, 4, may be disposed in the first and second body portions 21, 22, respectively, similar to the connector 1.

According to some embodiments of the technology disclosed herein, the shell 5D may be formed of metal and may define the assembly space 50 in which the insulative body 2 is accommodated. The shell 5D may be similar to the shell 5 of the electrical connector 1 except for the presence of a plurality of protrusions 59 that extend outwards from the assembly space 50, as shown in FIG. 13B. In some embodiments, the protrusions may be bent metal portions that project away from the assembly space 50. In some embodiments, the protrusions 59 may have an arcuate shape and, when observed from a plan view (see FIG. 13A), may define a space 59*a* between the shell 5D and an exterior surface of the insulative body 2. In some embodiments, one or more of the protrusions 59 may form part of an upper edge of the shell 5D, as shown in FIG. 13. In some embodiments, one or more of the protrusions 59 may located away from the upper edge of the shell 5D. For example, one or more of the protrusions 59 may be located at a lower edge of the shell 5D and/or one or more of the protrusions 59 may be located between the upper and lower edges of the shell 5D. In some embodiments, at least some of the protrusions 59 may face the front surface and/or the rear surface of the second body portion 22 of the insulative body 5.

According to some embodiments of the present technology, the shell 5D may be comprised of two long portions separated by two short portions. For example, as shown in FIG. 13B, the shell 5D may have a front portion 5D1 and a rear portion 5D2, which are relatively longer, separated by a left portion 5D3 and a right portion 5D4, which are relatively shorter. In some embodiments, similar to the shell 5 discussed above, the shell 5D may have at least two different heights, such that the shell 5D may at least two shoulders 51 at which there may be a transition in height. For example, the shell 5D may have a shoulder 51 located on the rear portion 5D2 of the shell 5D adjacent an interface between the first and second body portions 21, 22. In some embodiments, another shoulder 51 may be located on the right portion 5D4 of the shell 5D.

According to some embodiments of the present technology, the shell 5D may be comprised of a shell neck 503 on the front portion 5D1 of the shell 5D and/or on the rear portion 5D2 of the shell. Unlike the protrusions 59, which extend outwards from the assembly space 50, the shell neck 503 may be a recess that extends inward relative to the assembly space 50. For example, as shown in FIGS. 13 and 13B, the shell 5D may be comprised of two shell necks 503, one on each of the front and rear portions 5D1, 5D2, intending inwards relative to the assembly space. In some embodiments, a lower edge of each of the shell necks 503 may be comprised of a first shell clasping portion 501 configured to engage with the body clasping portions 28 protruding from the first body portion 21 of the insulative body 2. In some embodiments, the first body portion 21 of the insulative body 2 may be comprised of only a single body clasping portion 28 (e.g., on the front surface or on the rear surface of the first body portion), in which case the shell 5D may be comprised of the first shell clasping portion 501 configured to engage with the single body clasping portion 28.

According to some embodiments of the present technology, one or more of the protrusions 59 may extend in a direction parallel X direction (see FIG. 6) by a distance H1, as shown in FIG. 13A. For example, if the protrusion 59 extends from the rear portion 5D2 of the shell 5D, the distance H1 may be determined as a perpendicular distance from a surface plane of the rear portion 5D2 to an outer surface of the protrusion 59. In some embodiments, the shell neck 503 may be recessed inward by a distance H2, as shown in FIG. 13A. For example, if the shell neck 503 is part of the rear portion 5D2 of the shell 5D, the distance H1 may be determined as a perpendicular distance from a surface plane of the rear portion 5D2 to a surface plane of the shell neck 503. In some embodiments, the distance H1 may be less than the distance H2, such that shell neck 503 may extend inwards by a greater distance than a distance that the protrusion 59 extends outward. Although the protrusions 59 are shown to be located on the front and rear portions 5D1, 5D2 of the shell 5D, in some embodiments, one or more protrusions may be located on the left portion 5D3 and/or the right portion 5D4 in addition to, or instead of, the protrusions 59 on the front and rear portions 5D1, 5D2.

According to some embodiments of the present technology, the electrical connector D may be comprised of one or more of the first through sixth plugging spaces 52, 53, 54, 55, 56, 57. In some embodiments, similar to the electrical connector 1, the connector D may be comprised of the first and second plugging spaces 53, 52 located adjacent the first body portion of the insulative body 2, and also may be comprised of the third, fourth, fifth, and sixth plugging spaces, 54, 55, 56, 57 located adjacent the second body portion 22 of the insulative body 2, as shown in FIG. 13A.

According to some embodiments of the present technology, the protrusions 59 of the shell 5D may function to improve structural characteristics of the shell 5D. In some embodiments, the protrusions 59 may be effective to improve a strength of the shell 5D when subjected to vertical forces during a mating operation when a mating connector is being connected to the electrical connector D. For example, during a mating operation, forces that may be intended to be along the Z direction (see FIG. 6) may be slightly skewed, which may cause lateral or non-vertical forces ("misaligned forces") to be exerted again the connector D. If plugging legs of the mating connector are misaligned with the first through sixth plugging spaces 53, 52, 54, 55, 56, 57 during the mating operation, the presence of the protrusions 59 may prevent the misaligned forces from causing the shell 5D to flex or bend and, thus, may prevent weakening of the connector D. In some cases, without the presence of the protrusions 59, the shell 5D may bend and may loosen the structural attachment of the insulative body 2 to the shell 5D. In some embodiments, the protrusions 59 may serve as bearing surfaces and that may be effective to counteract misaligned forces applied by the mating connector to the connector D.

According to some embodiments of the present technology, the protrusions 59 of the shell 5D may function to minimize an insertion distance of the mating connector relative to the electrical connector D when the mating connector is misoriented (e.g., skewed from a proper insertion direction). For example, in a case where the mating connector is a plug connector and the connector D is a receptacle connector, one of more of the protrusions 59 may interfere with one or more surfaces of the misoriented mating connector during insertion of a portion of the mating connector into the connector D, thus limiting an amount that the mating connector may be inserted. By minimizing the insertion distance of the mating connector into the connector D, the protrusions 59 may prevent damage to the connector D and/or to the mating connector.

According to some embodiments of the present technology, the shell 5D may be provided with hooks 591, 591A, and the second body portion 22 of insulative body 2 may be provided with a hole 260 configured to receive the hook 591 therein, and a hole 260A configured to receive the hook 591A therein. In some embodiments, the hook 591 may extend from an upper edge of a front side of the shell 5D towards the assembly space 50, and the hook 591A may extend from an upper edge of a rear side of the shell 5D towards the assembly space 50. A height of the front side of the shell 5D may be different from a height of the rear side of the shell 5D due to the shell step 51, as discussed above, and therefore a height of the hook 591 may be different from a height of the hook 591A. In some embodiments, the height of the hook 591 may be greater than the height of the hook 591A. In some embodiments, the hole 260 may be a recess in a top surface of protrusion 26 extending outward from the second body portion 22 of the insulative body 2. In some embodiments, the protrusion 26 may extend upwards from the second mating interface 2211 of the second body portion 22 in the Z direction. In some embodiments, the protrusion 26 may extend outwards in the X direction from a front surface of the second body portion 22. In some embodiments, the protrusion 26 may extend outwards in the Z direction and in the X direction, as shown in FIG. 13B. In some embodiments, a height of the protrusion 26 may be such that the hole 260 may engage with the hook 591 when the shell 5D and the insulative body 2 are assembled together. In some embodiments, the hole 260A may be a recess in the second mating interface 2211 of the second body portion 22. In some embodiments, when the hook 591A is engaged with the hole 260A, a top surface of the hook 591A may be flush or even with the second mating interface 2211. In some embodiments, the protrusion 26 may extend outward in the X direction such that a front surface of the protrusion 26 may abut an internal surface of the shell 5D. In some embodiments, during insertion of the insulative body 2 into the assembly space 50 of the shell 5D, the hook 591 may extend into the hole 260 and the hook 591A may extend into the hole 260A, and the body clasping portion 28 may clasp to the first shell clasping portion 501.

Figure 14:
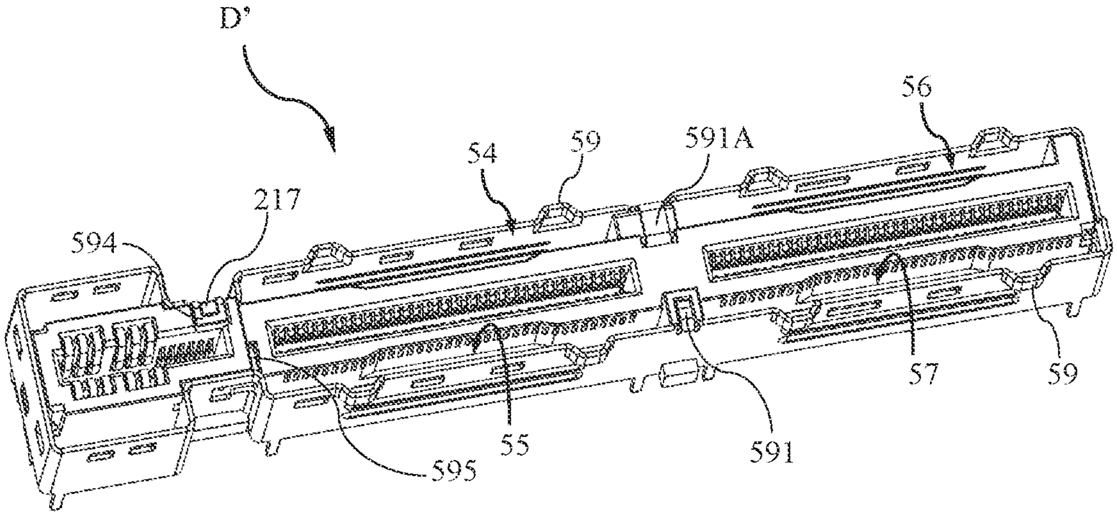
FIG. 14 shows a top front perspective view of an electrical connector, according to some embodiments of the present technology.
Figure 14A:
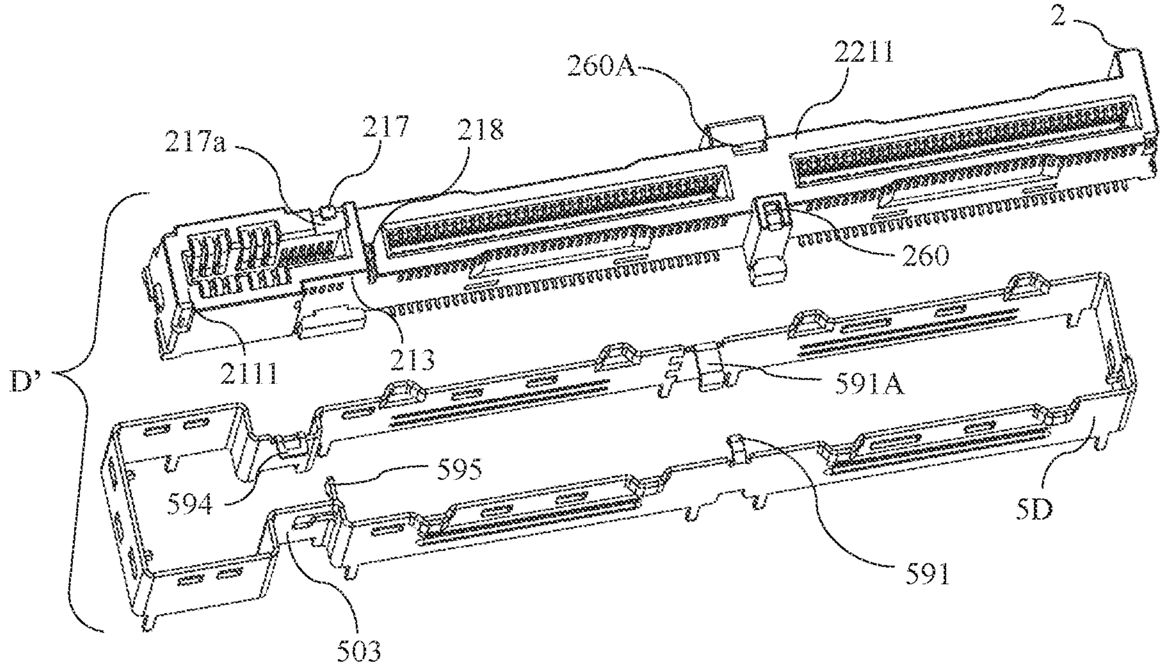
FIG. 14A shows the connector of FIG. 14 in a partially disassembled state.
Figure 14B:
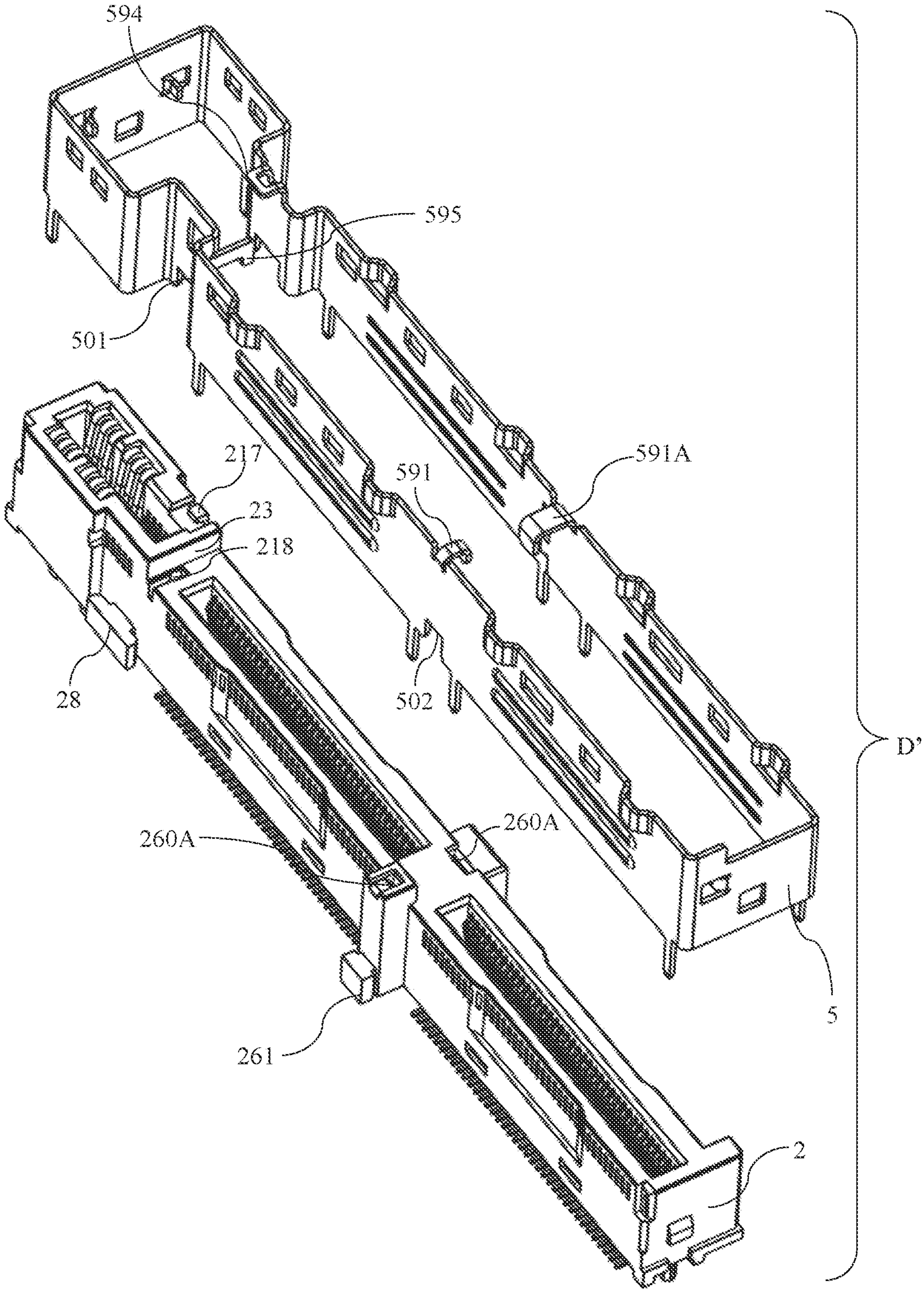
FIG. 14B shows a top rear perspective view of the connector of FIG. 14 in a partially disassembled state.

FIG. 14 shows a top front perspective view of an electrical connector D', according to some embodiments of the technology disclosed herein. FIG. 14A shows a top front perspective view of the connector D' in a partially disassembled state, and FIG. 14B shows a top rear perspective view of the connector D' in a partially disassembled state. The connector D' may be a variation of the electrical connector D discussed above.

According to some embodiments of the present technology, an upper surface of the first body portion 21 of the insulative body 2 of the electrical connector D' may be comprised of a locking protrusion 217, which may extend upwards in the Z direction. For example, the locking protrusion 217 may extend upwards from the body neck 213 of the first body portion 21. In some embodiments, the shell 5D of the connector D' may be comprised of a locking latch 594 configured to latch with the locking protrusion 217 when the insulative body 2 and the shell 5D are assembled together. In some embodiments, the locking latch 594 may be comprised of a loop configured to encircle the locking protrusion 217. In some embodiments, the locking protrusion 217 may extend from a recessed portion 217*a* of the first mating interface 2111 of the body neck 213 such that, when the locking latch 594 is latched with the locking protrusion 217, a top surface of the locking latch 594 and/or a top surface of the locking protrusion 217 may be flush with the first mating interface 2111.

According to some embodiments of the present technology, the second mating interface 2211 of the second body portion 22 of the electrical connector D' may be comprised of a locking recess 218 configured to engage with a locking hook 595 when the shell 5D and the insulative body 2 are assembled together. In some embodiments, the locking recess 218 may be located at an edge of the second body portion 22 adjacent a base of the step 23 between the first body portion 21 and the second body portion 22, as shown in FIG. 14B. In some embodiments, the connector D' may be comprised of one locking recess 218 on a front side or the body neck 213 or on a rear side of the body neck 213. In some embodiments, the connector D' may be comprised of two locking recesses 218, one on the front side and one on the rear side of the body neck 213.

According to some embodiments of the present technology, the third and fourth plugging spaces 54, 55 may have different Y-direction lengths and/or different X-direction widths. In some embodiments, the fifth and sixth plugging spaces 56, 57 may have different Y-direction lengths and/or different X-direction widths.

Figure 15:
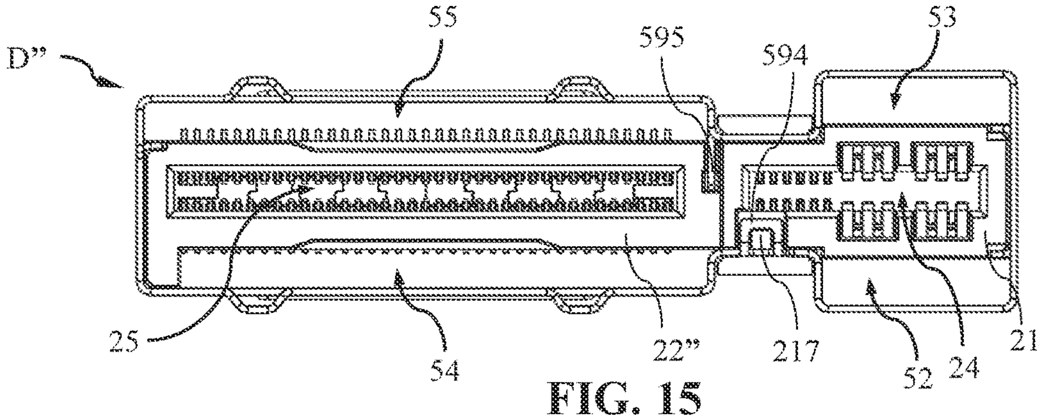
FIG. 15 shows a top plan view of an electrical connector, according to some embodiments of the present technology.
Figure 15A:
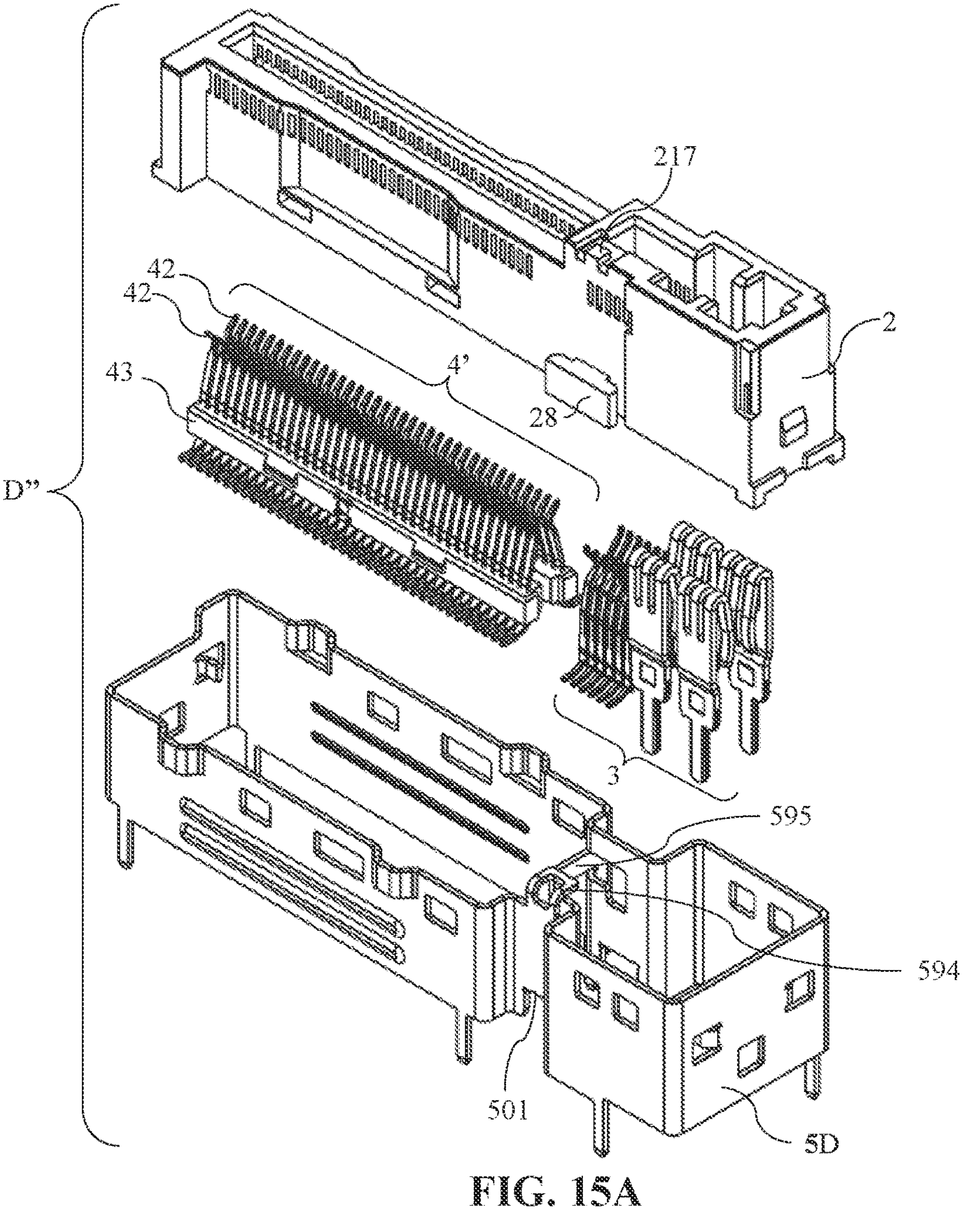
FIG. 15A shows a top rear perspective view of the connector of FIG. 15 in a partially disassembled state.

FIG. 15 shows a top plan view of an electrical connector D", according to some embodiments of the technology disclosed herein. FIG. 15A shows a top rear perspective view of the connector D" in a partially disassembled state. The connector D' may be a variation of the electrical connector D' discussed above.

According to some embodiments of the present technology, the electrical connector D" may be shortened or truncated version of the electrical connector D' such that the insulative body 2 of the connector D" includes the first body portion 21 with the first accommodating space 24 and includes a shortened second body portion 22" that includes the second accommodating space 25 but, unlike the connector D' does not include the third accommodation space 27. The shell 5D of the connector D" may encircle the insulative body 2 such that the first and second plugging spaces 53, 52 are located on opposite sides of the first body portion 21 and such that the third and fourth plugging spaces 54, 55 are located on opposite sides of the shortened second body portion 22", as shown in FIG. 15. In some embodiments, the shell 5D may include the locking latch 594 and the locking hook 595 to engage respectively with the locking protrusion 217 of the first body portion 21 and the locking recess 218 (not shown) of the shortened second body portion 22". In some embodiments, the connector D" may not include the hooks 591, 591A of the holes 260, 260A. In some embodiments, the connector D" may be comprised of the first terminal set 3 disposed in the first accommodating space 24 and another terminal set 4' disposed in the second accommodating space 25. In some embodiments, the third and fourth plugging spaces 54, 55 may have different Y-direction lengths and/or different X-direction widths.

First Plug Connector Design

Figure 16:
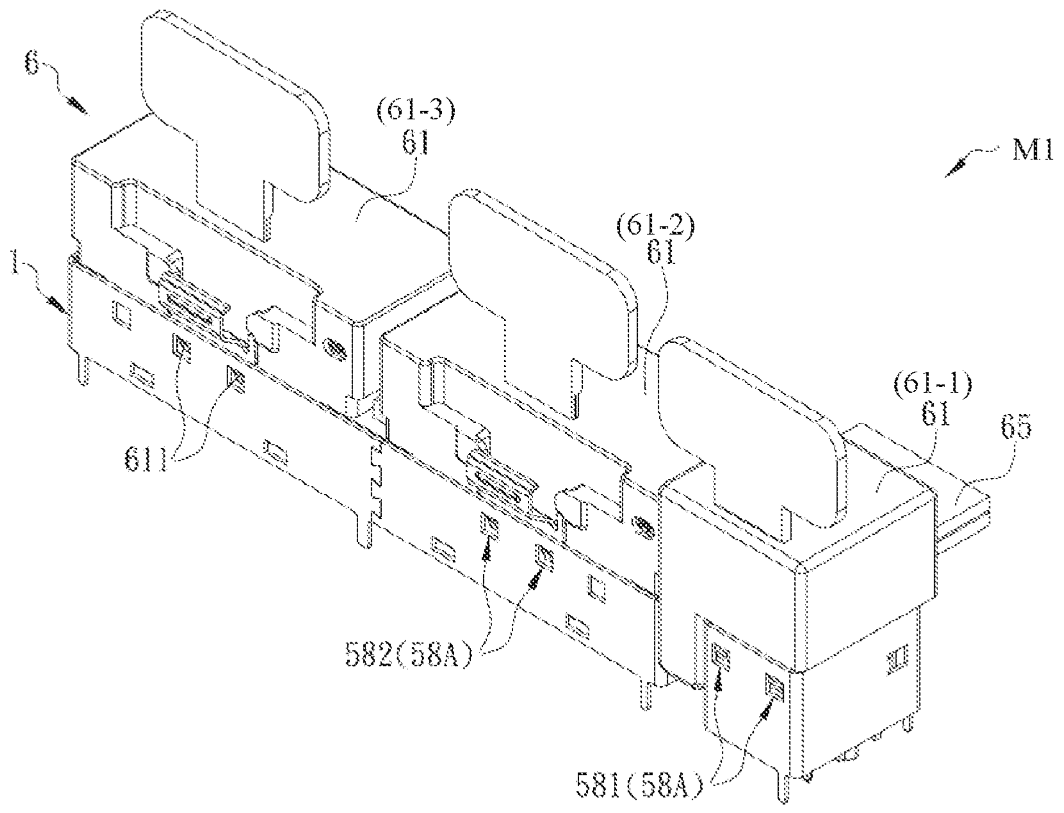
FIG. 16 shows a top rear perspective view of a mated pair of receptacle and plug connectors, according to some embodiments of the present technology.

The electrical connectors 1, B, C, D may be receptacle connectors and may be configured to mate with a plug connector. FIG. 16 shows a top rear perspective view of a mated pair of connectors M1 comprised of the connector 1 and a plug connector 6, according to some embodiments of the present technology. The plug connector 6 may have a first plug connector design of the present technology. It should be understood that the plug connector 6 may be used with the other connectors, B, C, D, although not specifically described in detail herein.

Figure 17:
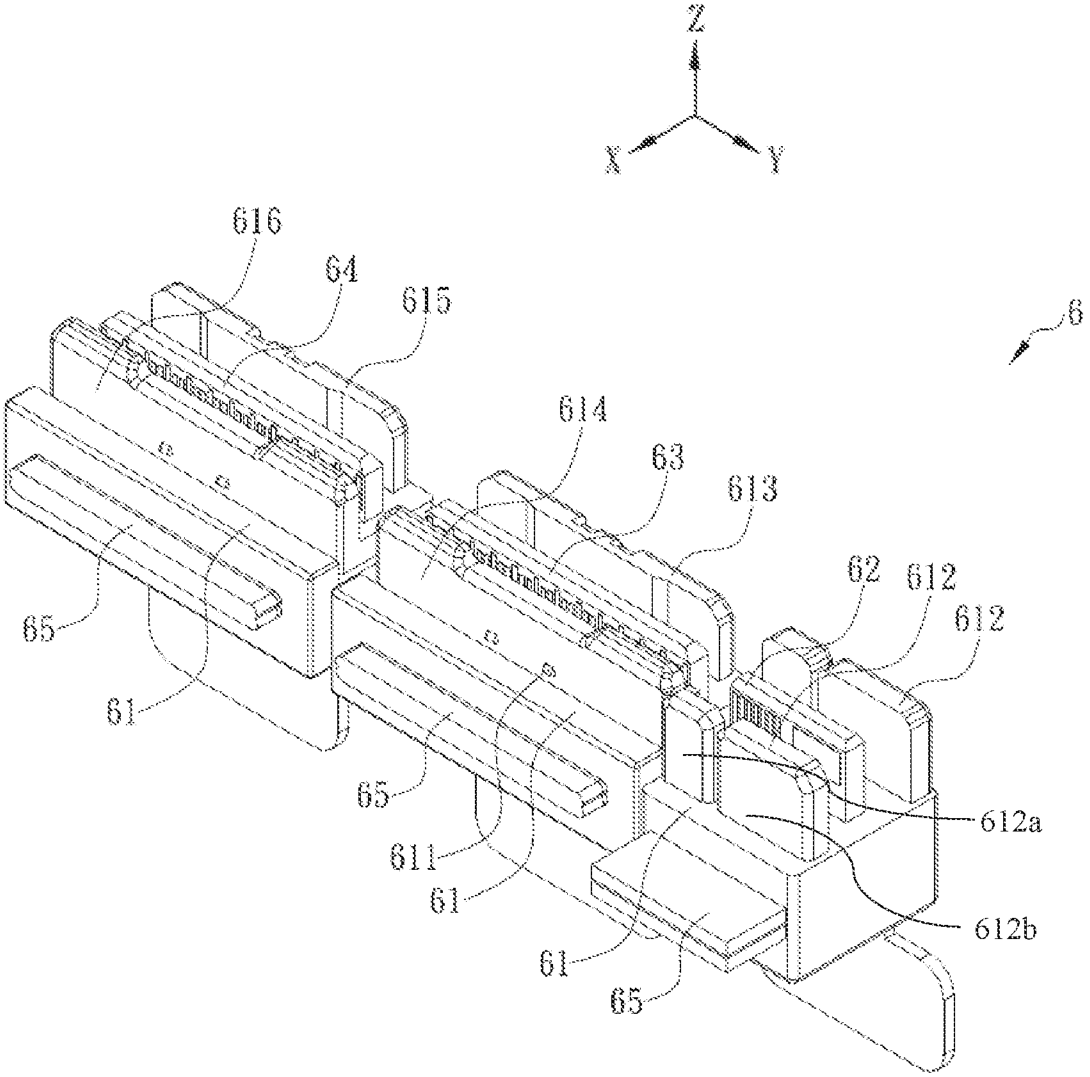
FIG. 17 shows a bottom rear perspective view of the plug connector of FIG. 16, according to some embodiments of the present technology.

FIG. 17 shows a bottom rear perspective view of the plug connector 6, according to some embodiments of the present technology. In some embodiments, the plug connector 6 may be comprised of an insulative plug body 61, a first plug connection portion 62 extending from the plug body 61 in a direction parallel to the Z direction, a second plug connection portion 63 extending from the plug body 61 in a direction parallel to the Z direction, and a third connector portion 64 extending from the plug body 61 in a direction parallel to the Z direction. The plug connector 6 may be described as having three segments: a first segment comprised of the first plug connection portion 62 and a section of the plug body 61 from which the first plug connection portion 62 extends; a second segment comprised of the second plug connection portion 63 and a section of the plug body 6 from which the second plug connection portion 63 extends; and a third segment comprised of the third plug connection portion 64 and a section of the plug body 61 from which the third plug connection portion 64 extends. In some embodiments, the first, second, and third plug connection portions 62, 63, 64 may be configured to be inserted in the first, second, and third accommodating spaces 24, 25, 27, respectively, of the receptacle connector 1. In some embodiments, the first, second, and third segments 1-1, 1-2, 1-3 of the receptacle connector 1 (see FIG. 8) may connect with the first, second, and third segments of the plug connector 6. In some embodiments, the first, second, and third plug connection portions 62, 63, 64 may be independent of each other. For example, the first plug connection portion 62 may be a first PCB, the second plug connection portion 63 may be a second PCB different from the first PCB, and the third plug connection portion 64 may be a third PCB different from the first and second PCBs. The first plug connection portion 62 may be comprised of wiring and metal contacts configured to transmit signals and/or power to and/or from the first and third metal terminals 31, 33 of the first terminal set 3 of the receptacle connector 1. Similarly, the second and third plug connection portions 63, 64 may be comprised of wiring and metal contacts configured to transmit signals and/or power to and/or from the second metal terminals 42 of the second terminal set 4 of the receptacle connector 1. In some embodiments, the plug connector 6 may be further comprised of at least one transmission cable 65. For example, each of the first, second, and third plug connection portions 62, 63, 64 may be electrical connected to its own transmission cable 65, as depicted in FIG. 17.

According to some embodiments of the present technology, the plug connector 6 may be comprised of a plurality of plugging blocks configured to be inserted in the plugging spaces of the receptacle connector 1 when the plug connector 6 is mated with the receptacle connector 1. The plugging blocks may be comprised of one or more bars and/or one or more legs and/or one or more other types of elongated protrusions that may be inserted in the plugging spaces of the receptacle connector. In some embodiments, the plug connector 6 may be comprised of front and rear first plugging blocks 612 configured to be inserted in the front and rear (first and second) plugging spaces 53, 52 of the receptacle connector 1. The first plugging blocks 612 may be bar-shaped protrusions extending parallel to the Z direction. In some embodiments, the first plugging block 612 may itself be comprised of a plurality of legs 612*a*, 612*b* extending parallel to the Z direction. In some embodiments, the plug connector 6 may be further comprised of second and third plugging blocks 613, 614 extending parallel to the Z direction. The second and third plugging blocks 613, 614 may be configured to be inserted in the third and fourth plugging spaces 54, 55, respectively, of the receptacle connector 1. In some embodiments, the third and fourth plugging spaces 54, 55 may have different Y-direction lengths, and the second and third plugging blocks 613, 614 may have different Y-direction lengths such that the second and third plugging blocks 613, 614 may fit snugly in the third and fourth plugging spaces 54, 55, respectively. Similarly, the plug connector 6 may be further comprised of fourth and fifth plugging blocks 615, 616 extending parallel to the Z direction. The fourth and fifth plugging blocks 615, 616 may be configured to be inserted in the fifth and sixth plugging spaces 56, 57, respectively, of the receptacle connector 1. In some embodiments, the fifth and sixth plugging spaces 56, 57 may have different Y-direction lengths, and the fourth and fifth plugging blocks 615, 616 may have different Y-direction lengths such that the fourth and fifth plugging blocks 615, 616 may fit snugly in the fifth and sixth plugging spaces 56, 57, respectively. In some embodiments, the plug connector 6 may be further comprised of protrusions 611 located on external surfaces of the second through fifth plugging blocks 613 through 616. The protrusions 611 may be configured to engage with the second assembly holes 582 of the first assembly hole set 58A of the receptacle connector 1, ensure that the plug and receptacle connectors 6, 1 are in a fixed position relative to each other. Although not depicted in FIGS. 16 and 17, the first plugging blocks 612 also may be comprised of protrusions configured to engage with the first assembly holes 581 of the first assembly hole set 58A.

As discussed above, the first through sixth plugging spaces 52 through 57 and the first through fifth plugging blocks 612 through 616 (collectively, "alignment structures") may ensure that the plug and receptacle connectors 6, 1 are properly aligned with each other before force is applied to push the connectors 6, 1 together. In some embodiments, the alignment structures may prevent skewing, where the connectors 6, 1 are tilted relative to each other in the Z direction. In some embodiments, the alignment structures may prevent a lateral displacement, where the connectors 6, 1 are shifted in the X direction and/or in the Y direction relative to each other. In some embodiments, the alignment structures may prevent skewing as well as a lateral displacement. In some embodiments, the alignment structures may prevent rotational misalignment, where the connectors 6, 1 may be aligned along the Z direction but misaligned along the X and Y directions. In some embodiments, the alignment structures may prevent front-back reversal or a 180° rotational misalignment. As will be appreciated, prevention of misalignment may reduce the possibility of damage to the metal terminals 31, 33, 42 of the receptacle connector 1 and/or damage to the metal contacts of the plug connector 6 and/or damage to other parts of the connectors 6, 1.

According to some embodiments of the present technology, the three segments of the plug connector 6 may be inserted in the receptacle connector 1 separately. In some embodiments, the plug body 61 may be comprised of a first body portion 61-1, a second body portion 61-2, and a third body portion 61-3, which may be independent of each other. The first segment of the plug connector 6, which may be comprised of the first body portion 61-1, the first plug connection portion 62, and the first plugging blocks 612, may be inserted in the receptacle connector 1 as a unit. Similarly, the second segment of the plug connector 6, which may be comprised of the second body portion 61-2, the second plug connection portion 63, and the second and third plugging blocks 613, 614, may be inserted in the receptacle connector 1 as a unit before or after insertion of the unit forming the first segment. Similarly, the third segment of the plug connector 6, which may be comprised of the third body portion 61-3, the third plug connection portion 64, and the fourth and fifth plugging blocks 615, 616, may be inserted in the receptacle connector 1 as a unit before or after insertion of the unit forming the first segment and before or after the unit forming the second segment.

Second Plug Connector Design

Figure 18:
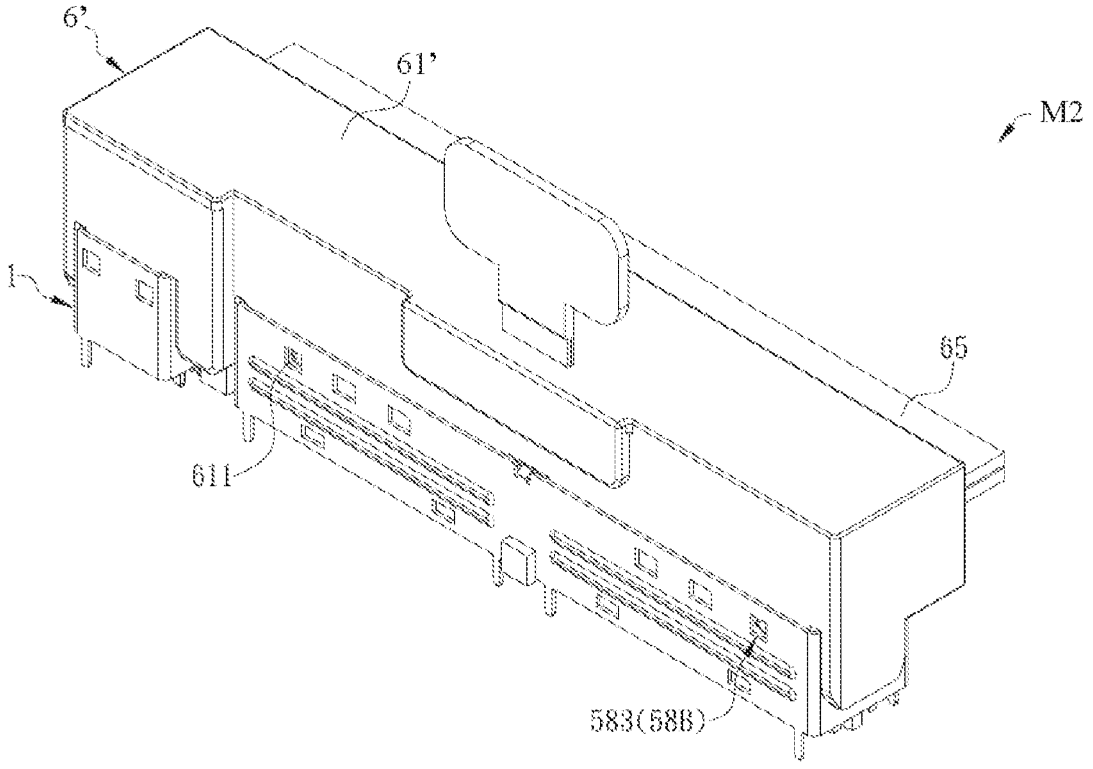
FIG. 18 shows a top rear perspective view of a mated pair of receptacle and plug connectors, according to some embodiments of the present technology.

FIG. 18 shows a top rear perspective view of a mated pair of connectors M2 comprised of the connector 1 and a plug connector 6', according to some embodiments of the present technology. The plug connector 6' may have a second plug connector design of the present technology. It should be understood that the plug connector 6' may be used with the other connectors, B, C, D, although not specifically described in detail herein. The plug connector 6' may have some obvious similarities with the plug connector 6 and therefore of the similarities descriptions will not be repeated.

Figure 19:
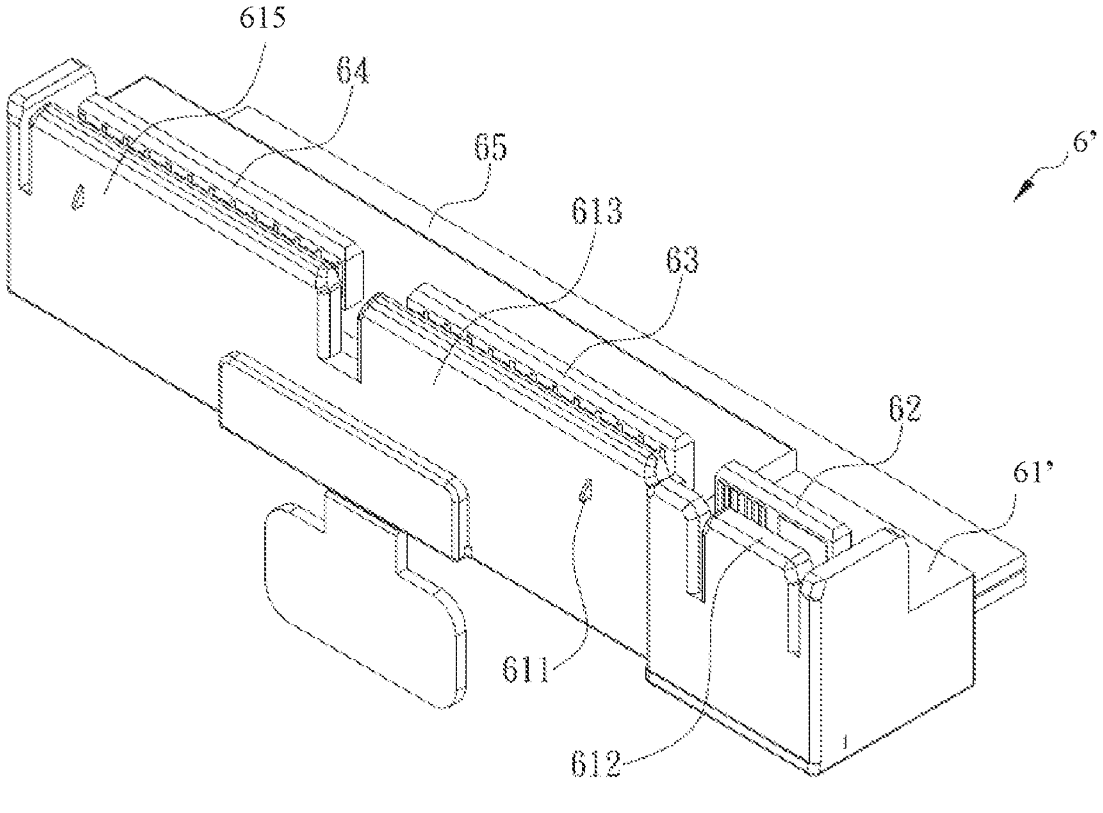
FIG. 19 shows a bottom front perspective view of the plug connector of FIG. 18, according to some embodiments of the present technology.

FIG. 19 shows a bottom front perspective view of the plug connector 6', according to some embodiments of the present technology. In some embodiments, the plug connector 6' may be comprised of an insulative plug body 61', a first plug connection portion 62 extending from the plug body 61' in a direction parallel to the Z direction, a second plug connection portion 63 extending from the plug body 61' in a direction parallel to the Z direction, and a third connector portion 64 extending from the plug body 61' in a direction parallel to the Z direction. Unlike the plug body 61 of the plug connector 6, the plug body 61' of the plug connector 6' may be a single unit may not be separated into a plurality of units. That is the first, second, and third plug connection portions 62, 63, 64 may extend from the same single unit forming the plug body 61'.

According to some embodiments of the present technology, the plug connector 6' may be comprised of a plurality of plugging blocks one side of the plug body 61'. For example, the plug connector 6' may be comprised of the first plugging block 612, the third plugging block 613, and the fifth plugging block 615 on a front side of the first, second, and third plug connection portions 62, 63, 64, such that front surfaces of the first, second, and third plug connection portions 62, 63, 64 face the first, second, and fourth plugging blocks 612, 613, 615, respectively. In some embodiments, the plug connector 6' may have no plugging block facing a rear surface of any of the first, second, and third plug connection portions 62, 63, 64. In some embodiments, the plug connector 6' may be comprised of the first through fifth plugging blocks 612 through 616 arranged to face front and rear surfaces of the first, second, and third plug connection portions 62, 63, 64, similar to the plug connector 6. In some embodiments, the plug connector 6' may be comprised of the first, second, and fourth plugging blocks 612, 613, 615 facing the front surface of the first, second, and third plug connection portions 62, 63, 64 and one or two of first, third, and fifth plugging blocks 612, 614, 616 facing one or two of the rear surfaces of the first, second, and third plug connection portions 62, 63, 64. In some embodiments, the plug connector 6' may be further comprised of protrusions 611 located on external surfaces of the second and fourth plugging blocks 613, 615. The protrusions 611 may be configured to engage with the third assembly holes 583 of the second assembly hole set 58B of the receptacle connector 1, ensure that the plug and receptacle connectors 6', 1 are in a fixed position relative to each other.

According to some embodiments of the present technology, the mated pair of connectors M1 may be discerned from the a mated pair of connectors M2 by the locations of the protrusions 611 visible through the first, second, and third assembly holes 581, 582, 583 of the first and second assembly hole sets 58A, 58B. For example, an operator may identify whether a mated pair of connectors is the mated pair of connectors M1 or the mated pair of connectors M2 by whether a single protrusion 611 is visible through the third assembly hole 583 corresponding to each of the second and third plug connection portions 63, 64, indicating the mated pair of connectors M2, or whether a pair of protrusions 611 are visible through the second assembly holes 582 corresponding to each of the second and third plug connection portions 63, 64, indicating the mated pair of connectors M1.

It should be understood that various alterations, modifications, and improvements may be made to the structures, configurations, and methods discussed above, and are intended to be within the spirit and scope of the invention disclosed herein. Further, although advantages of the present invention are indicated, it should be appreciated that not every embodiment of the invention will include every described advantage. Some embodiments may not implement any features described as advantageous herein. Accordingly, the foregoing description and attached drawings are by way of example only.

It should be understood that some aspects of the present technology may be embodied as one or more methods, and acts performed as part of a method of the present technology may be ordered in any suitable way. Accordingly, embodiments may be constructed in which acts are performed in an order different than shown and/or described, which may include performing some acts simultaneously, even though shown and/or described as sequential acts in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. As a specific example, a fixing mechanism, for fixing a shell to a housing, described in connection with one embodiment may be used in conjunction with other embodiments instead of or in addition to the fixing mechanisms illustrated for that embodiment. As another example, a shell illustrated in connection with a connector housing with multiple separately formed segments may be used in connection with a an integrally formed housing with a similar perimeter, and vice versa.

Use of ordinal terms such as "first," "second," "third," etc., in the description and the claims to modify an element does not by itself connote any priority, precedence, or order of one element over another, or the temporal order in which acts of a method are performed, but are used merely as labels to distinguish one element or act having a certain name from another element or act having a same name (but for use of the ordinal term) to distinguish the elements or acts.

In addition, directional terms may be mentioned in connection with various embodiments, such as, e.g., "upper," "lower," "front," "rear," "left," "right," etc., and may refer to directions in the drawings. These directional terms used are for purposes of illustration and are not intended to limit the scope of the present disclosure of the scope of the claims.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

As used herein in the specification and in the claims, the phrase "equal" or "the same" in reference to two values (e.g., distances, widths, etc.) means that two values are the same within manufacturing tolerances. Thus, two values being equal, or the same, may mean that the two values are different from one another by ±5%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. Use of terms such as "including," "comprising," "comprised of," "having," "containing," and "involving," and variations thereof herein, is meant to encompass the items listed thereafter and equivalents thereof as well as additional items.

The terms "approximately" and "about" if used herein may be construed to mean within ±20% of a target value in some embodiments, within ±10% of a target value in some embodiments, within ±5% of a target value in some embodiments, and within ±2% of a target value in some embodiments. The terms "approximately" and "about" may equal the target value.

The term "substantially" if used herein may be construed to mean within 95% of a target value in some embodiments, within 98% of a target value in some embodiments, within 99% of a target value in some embodiments, and within 99.5% of a target value in some embodiments. In some embodiments, the term "substantially" may equal 100% of the target value.

LIST OF REFERENCE NUMERALS

A: Electrical connector
B: Electrical connector
C: Electrical connector
C-a: First segment
C-b: Second segment
D: Electrical connector
D': Electrical connector
D": Electrical connector
F1: First pin pitch
F2: Second pin pitch
G: Groove
H1: Protrusion distance
H2: Neck recess distance
L1: First plane
L2: Second plane
L-21A: Length of first body portion
L-22A: Length of second body portion
M1: Mated pair of connectors
M2: Mated pair of connectors
W1: First shell width
W2: Second shell width
W3: Third shell width
S: Connector set
1: Electrical connector
1-*a*: First segment
1-*b*: Second segment
1-1: First segment
1-2: Second segment
1-3: Third segment
2: Insulative body
21: First body portion
21A: First body portion
211: First mating surface
2111: First mating interface
213: Body neck
216*a*: Engagement protrusion
216*b*: Engagement recess
217: Locking protrusion
218: Locking recess
22: Second body portion
22A: Second body portion
221: Second mating surface
2211: Second mating interface
2212: Third mating interface
23: Shoulder
24: First accommodating space
25: Second accommodating space
26: Protrusion
260: Hole
260A: Hole
261: Protrusion clasping portion
27: Third accommodating space
28: Body clasping portion
28A: Channel
29: Engagement groove
291: Protrusion
3: First terminal set
31: First metal terminal
33: Third metal terminal
34: First terminal base
4: Second terminal set
42: Second metal terminal
43: Second terminal base
44: Third terminal base
5: Metal shell

5A: First shell portion
5*a*: first shell interface
5B: Second shell portion
5*b*: second shell interface
5D: Metal shell
5D1: Front shell portion
5D2: Rear shell portion
5D3: Left shell portion
5D4: Right shell portion
50: Assembly space
501: First shell clasping portion
502: Second shell clasping portion
503: Shell neck
51: Shell step
52: Rear or second plugging space
53: Front or first plugging space
54: Third plugging space
55: Fourth plugging space
56: Fifth plugging space
57: Sixth plugging space
58A: First assembly hole set
58B: Second assembly hole set
581: First assembly hole
582: Second assembly hole
583: Third assembly hole
59: Shell protrusion
59*a*: Space defined by shell protrusion
591: Hook
591A: Hook
592: Engagement protrusion
593: Mounting pin
594: Locking latch
595: Locking hook
6: Plug connector
6': Plug connector
61: Plug body
61': Plug body
61-1: First body portion
61-2: Second body portion
61-3: Third body portion
62: First plug connection portion
63: Second plug connection portion
64: Third plug connection portion
65: Cable
611: Protrusion
612: First plugging block
612*a*: Leg
612*b*: Leg
613: Second plugging block
614: Third plugging block
615: Fourth plugging block
616: Fifth plugging block

What is claimed is:

1. An electrical connector, comprising:

an insulative housing, wherein the housing is comprised of:

a first portion including a first segment having a first height and first external surfaces facing first internal surfaces of the first portion of a shell, a second portion including at least one housing segment, the second portion having a second height and second external surfaces facing second internal surfaces of the second portion of the shell, and the first height of the first portion of the housing is different from the second height of the second portion of the housing such that a shoulder is positioned between the first portion of the housing and the second portion of the housing;

a plurality of sets of terminals, the sets of terminals each being comprised of a plurality of metal terminals, and the sets of terminals being disposed in respective segments of the housing such that contact portions of the metal terminals are exposed in openings of the housing and arranged to contact conductive portions of a mating connector when the electrical connector and the mating connector are mated; and a shell configured to surround external surfaces of the housing, wherein the shell is comprised of:

a first portion having a first length and a first width, and a second portion having a second length and a second width different from the first width.

2. An electrical connector, comprising:

an insulative housing;

a plurality of sets of terminals, the sets of terminals each being comprised of a plurality of metal terminals, and the sets of terminals being disposed in respective segments of the housing such that contact portions of the metal terminals are exposed in openings of the housing and arranged to contact conductive portions of a mating connector when the electrical connector and the mating connector are mated; and a shell configured to surround external surfaces of the housing, wherein the shell is comprised of:

a first portion having a first length and a first width, and a second portion having a second length and a second width different from the first width, wherein:

the first portion of the shell has a first height, and the second portion of the shell has first and second sides, the first side having the first height and the second side having a second height different from the first height such that on the second side a step is positioned between the first portion of the shell and the second portion of the shell.

3. The electrical connector of claim 2, wherein the step is a right-angle step.

4. The electrical connector of claim 2, wherein the first height of the shell is greater than the second height of the shell.

5. The electrical connector of claim 2, wherein the housing is comprised of:

a first portion including a first segment having a first height and first external surfaces facing first internal surfaces of the first portion of the shell, and a second portion including at least one housing segment, the second portion having a second height and second external surfaces facing second internal surfaces of the second portion of the shell, and wherein the first height of the first portion of the housing is different from the second height of the second portion of the housing such that a shoulder is positioned between the first portion of the housing and the second portion of the housing.

6. The electrical connector of claim 5, wherein a position of the shoulder of the housing is proximate a position of the step of the shell.

7. The electrical connector of claim 5, wherein the shoulder of the housing is a right-angle shoulder.

8. The electrical connector of claim 5, wherein the first height of the first portion of the shell is level with the first height of the first portion of the housing.

9. The electrical connector of claim 5, wherein the second height of the second portion of the shell is level with the second height of the second portion of the housing.

10. The electrical connector of claim 5, wherein:
the shell is further comprised of a third portion positioned between the first and second portions of the shell, the third portion having a third width less that each of the first and second widths of the first and second portions such that a shape of the shell is comprised of at least one recess positioned between the first and second portions of the shell, and
the step of the shell is adjacent to and connects the third portion of the shell to the second side of the second portion of the shell.

11. The electrical connector of claim 10, wherein:
the first portion of the housing has a first width,
the second portion of the housing has a second width,
the housing is further comprised of a third portion having a third width less than each of the first and second widths of the first and second portions of the housing,
the third portion of the housing is positioned between the first and second portions of the housing such that a shape of the housing is comprised of at least one recess positioned between the first and second portions of the housing, and
the shoulder of the housing is adjacent to and connects the third portion of the housing to the second portion of the housing.

12. The electrical connector of claim 11, wherein:
the housing is comprised of at least one protrusion, and
the shell is comprised of at least one edge recess configured to engage with the at least one protrusion to fix a position of the shell relative to the housing.

13. The electrical connector of claim 12, wherein:
the at least one protrusion of the housing includes a protrusion extending from the third portion of the housing, and
the at least one edge recess of the shell includes an edge recess in the third portion of the shell.

14. The electrical connector of claim 12, wherein:
the at least one protrusion of the housing includes a protrusion extending from the second portion of the housing, and
the at least one edge recess of the shell includes an edge recess in the second portion of the shell.

15. The electrical connector of claim 12, wherein the at least one protrusion of the housing is comprised of a channel configured to accommodate an edge of the at least one edge recess of the shell.

16. The electrical connector of claim 5, wherein:
the second portion of the housing is comprised of a first housing segment having first and second sides respectively facing first and second internal surfaces on the first and second sides of the shell,
at least a portion of the first side of the first housing segment is spaced apart from the first internal surface of the shell by a first plugging space configured to receive a first leg of the mating connector when the electrical connector and the mating connector are mated, and
the first side of the first housing segment is comprised of a first groove elongated in a mating direction such that the first plugging space is comprised of at least two widths, a first width of the first plugging space adjacent the first groove being greater than a second width of the first plugging space not adjacent the first groove.

17. The electrical connector of claim 16, wherein the second portion of the shell is comprised of a plurality of first locking portions positioned opposite the second portion of the housing, at least some of the first locking portions being configured to engage with engagement portions of the first leg of the mating connector when the electrical connector and the mating connector are mated.

18. The electrical connector of claim 17, wherein at least two of the first locking portions are positioned opposite the first groove of the first housing segment.

19. The electrical connector of claim 17, wherein the first locking portions are comprised of at least two locking holes configured to engage with at least two protrusions extending from the first leg of the mating connector.

20. The electrical connector of claim 16, wherein:
the second portion of the housing is comprised of a second housing segment having first and second sides respectively facing the first and second internal surfaces on the first and second sides of the shell,
at least a portion of the first side of the second housing segment is spaced apart from the first internal surface of the shell by a second plugging space configured to receive a second leg of the mating connector when the electrical connector and the mating connector are mated, and
the first side of the second housing segment is comprised of a second groove such that the second plugging space is comprised of at least two widths, a first width of the second plugging space adjacent the second groove being greater than a second width of the second plugging space not adjacent the second groove.

21. The electrical connector of claim 20, wherein the first and second housing segments of the second portion of the housing are separated by a protrusion block comprised of a first surface configured to abut an internal surface of the second portion of the shell.

22. The electrical connector of claim 21, wherein at least a portion of the protrusion block has a height greater than the second height of the second portion of the housing.

23. The electrical connector of claim 22, wherein the second portion of the shell is comprised of an engagement portion configured to engage with an engagement portion of the protrusion block of the housing.

24. The electrical connector of claim 23, wherein:
the engagement portion of the second portion of the shell is comprised of a hook, and
the engagement portion of the protrusion block of the housing is comprised of a recess configured to receive the hook.

25. The electrical connector of claim 21, wherein:
the protrusion block is comprised of a protrusion extending in a direction towards the shell, and
the shell is comprised of an edge recess configured to engage with the protrusion of the protrusion block such that a surface of the protrusion extends beyond an outer surface of the second portion of the shell.

26. An electrical connector, comprising:
an insulative housing;
a plurality of sets of terminals, the sets of terminals each being comprised of a plurality of metal terminals, and the sets of terminals being disposed in respective segments of the housing such that contact portions of the metal terminals are exposed in openings of the housing and arranged to contact conductive portions of a mating connector when the electrical connector and the mating connector are mated;
a shell configured to surround external surfaces of the housing, wherein the shell is comprised of:
a first portion bounding external surfaces of a first segment of the housing and having a first length and a first width, and a second portion bounding external surfaces of a second segment of the housing and having a second length and a second width different from the first width, wherein:

the first segment and the second segment each comprises an accommodating space formed of a recess extending into the insulative housing and configured to receive a protruding portion of the mating connector; and the first portion of the shell and the second portion of the shell are each comprised of a plurality of locking portions configured to engage with a plurality of engagement portions of the mating connector when the electrical connector and the mating connector are mated.

27. The electrical connector of claim 26, wherein:

the first width of the first portion of the shell is greater than the first width of the first portion of the housing such that the first portion of the shell is spaced apart from the first portion of the housing by first and second spaces configured to accommodate first and second mating blocks of the mating connector when the electrical connector and the mating connector are mated, and the locking portions of the first portion of the shell are locking holes configured to engage with protruding engagement portions on the first and second mating blocks of the mating connector.

28. An electrical connector, comprising:

an insulative housing;

at least one housing latch portion extending from a surface of the housing;

a plurality of sets of terminals, the sets of terminals each being comprised of a plurality of metal terminals disposed in the housing such that contact portions of the metal terminals are exposed in at least one opening of the housing and arranged to contact conductive portions of a mating connector when the electrical connector and the mating connector are mated; and a shell configured to surround external surfaces of the housing, wherein the shell is comprised of:

a first portion having a first width, a second portion having a second width different from the first width, and at least one shell latch portion configured to latch with the at least one housing latch portion to fix a position of the shell relative to the housing, wherein:

the at least one housing latch portion is comprised of at least one protrusion extending from a side surface of the housing, and the at least one shell latch portion is comprised of at least one recess configured to latch to the at least one protrusion.

29. The electrical connector of claim 28, wherein:

the second width is less than the first width, and the at least one shell latch is located on the second portion of the shell.

30. The electrical connector of claim 28, wherein:

the at least one housing latch portion is comprised of a locking protrusion located on a top surface of the housing, and the at least one shell latch portion is comprised of a locking latch configured to latch to the locking protrusion.

31. The electrical connector of claim 30, wherein:

the locking protrusion protrudes from a recess in a mating surface of the housing such that a top surface of the lock protrusion is even with the mating surface of the housing, and the locking latch is configured to latch to the locking protrusion such that a top surface of the locking latch is flush with the mating surface of the housing.

* * * * *